United States Patent
Chinivaranahalli Shastry et al.

(10) Patent No.: US 10,830,792 B2
(45) Date of Patent: Nov. 10, 2020

(54) SCANNING TUNNELING THERMOMETER

(71) Applicant: Arizona Board of Regents on Behalf of the University of Arizona, Tucson, AZ (US)

(72) Inventors: Abhay Shankar Chinivaranahalli Shastry, Tucson, AZ (US); Charles Allen Stafford, Tucson, AZ (US)

(73) Assignee: Arizona Board of Regents on Behalf of the University of Arizona, Tucson, AZ (US)

( * ) Notice: Subject to any disclaimer, the term of this patent is extended or adjusted under 35 U.S.C. 154(b) by 0 days.

(21) Appl. No.: 16/352,808

(22) Filed: Mar. 13, 2019

(65) Prior Publication Data
US 2019/0285664 A1    Sep. 19, 2019

Related U.S. Application Data

(60) Provisional application No. 62/642,359, filed on Mar. 13, 2018.

(51) Int. Cl.
*G01Q 60/10* (2010.01)
*G01K 11/00* (2006.01)
(Continued)

(52) U.S. Cl.
CPC ............. *G01Q 60/10* (2013.01); *G01K 11/00* (2013.01); *G01Q 60/14* (2013.01); *G01Q 60/58* (2013.01)

(58) Field of Classification Search
CPC ........ G01Q 60/10; G01Q 60/14; G01Q 60/58; G01K 11/00
(Continued)

(56) References Cited

U.S. PATENT DOCUMENTS

2009/0293928 A1*  12/2009  Liang ..................... C01G 21/21
                                                                    136/201
2012/0198591 A1*   8/2012  Ohnesorge .......... H01L 29/1604
                                                                    850/23
(Continued)

OTHER PUBLICATIONS

Abhay Shastry and Charles A. Stafford. Temperature and voltage measurement in quantum systems far from equilibrium. Phys. Rev. B, 94:155433, Oct 2016.
(Continued)

*Primary Examiner* — Nicole M Ippolito
(74) *Attorney, Agent, or Firm* — Thomas Horstemeyer, LLP

(57) ABSTRACT

Various examples are provided related to scanning tunneling thermometers and scanning tunneling microscopy (STM) techniques. In one example, a method includes simultaneously measuring conductance and thermopower of a nanostructure by toggling between: applying a time modulated voltage to a nanostructure disposed on an interconnect structure, the time modulated voltage applied at a probe tip positioned over the nanostructure, while measuring a resulting current at a contact of the interconnect structure; and applying a time modulated temperature signal to the nanostructure at the probe tip, while measuring current through a calibrated thermoresistor in series with the probe tip. In another example, a device includes an interconnect structure with connections to a first reservoir and a second reservoir; and a scanning tunneling probe in contact with a probe reservoir. Electrical measurements are simultaneously obtained for temperature and voltage applied to a nanostructure between the reservoirs.

20 Claims, 10 Drawing Sheets

(51) Int. Cl.
*G01Q 60/58* (2010.01)
*G01Q 60/14* (2010.01)

(58) Field of Classification Search
USPC .................................. 850/1, 2, 3, 4, 26, 29
See application file for complete search history.

(56) References Cited

U.S. PATENT DOCUMENTS

2019/0018041 A1* 1/2019 Ilani .................... H01L 29/1029
2019/0192871 A1* 6/2019 Alphandery ....... A61K 41/0052

OTHER PUBLICATIONS

Jonathan R. Widawsky et al. Simultaneous determination of conductance and thermopower of single molecule functions. Nano Lett. 2012, 12, 1, 354-358. Nov 2011.

* cited by examiner

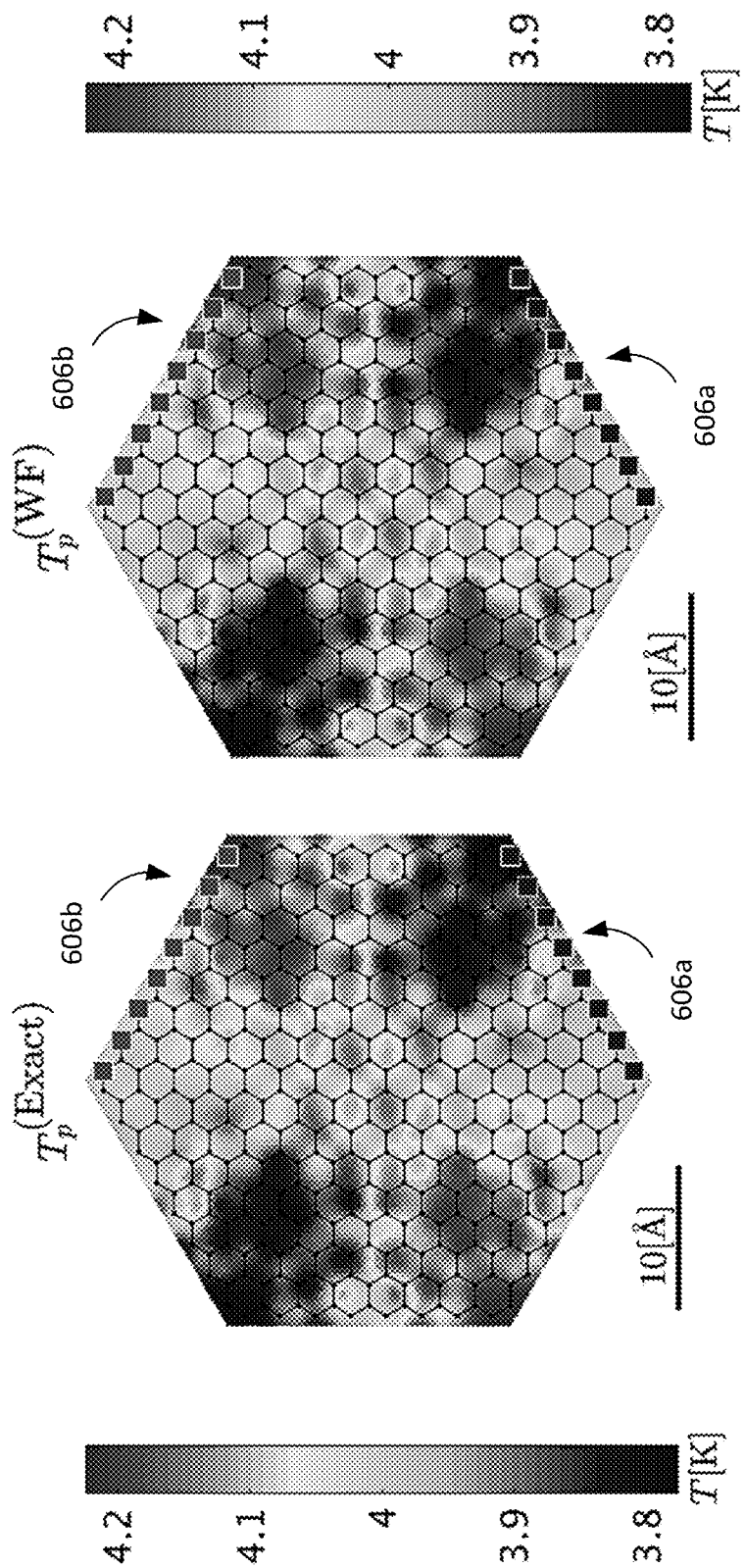

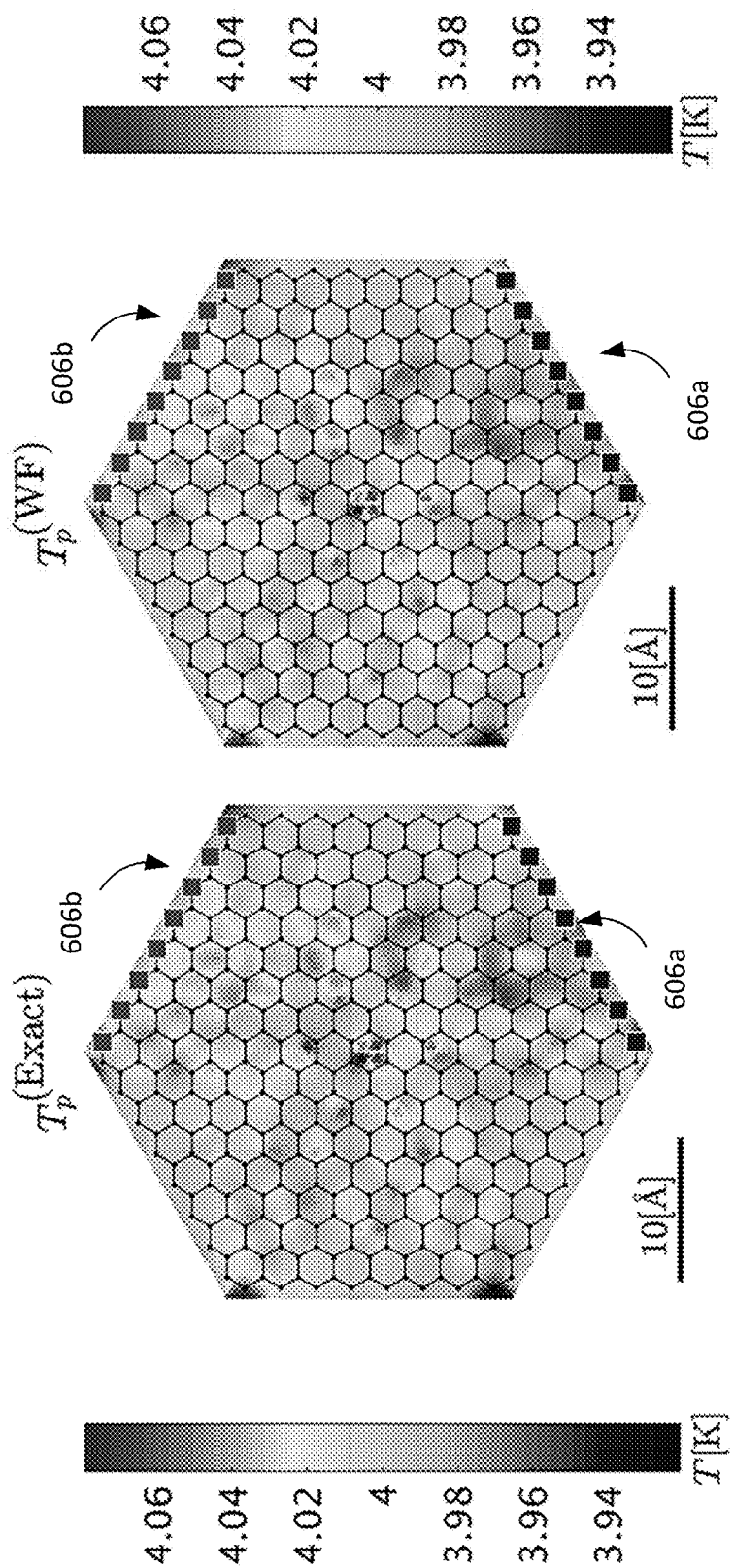

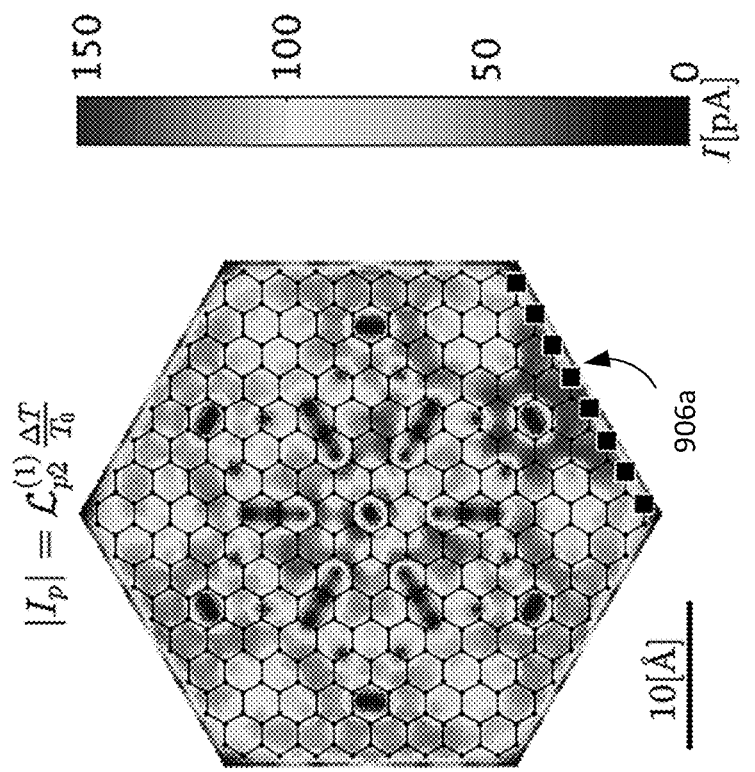
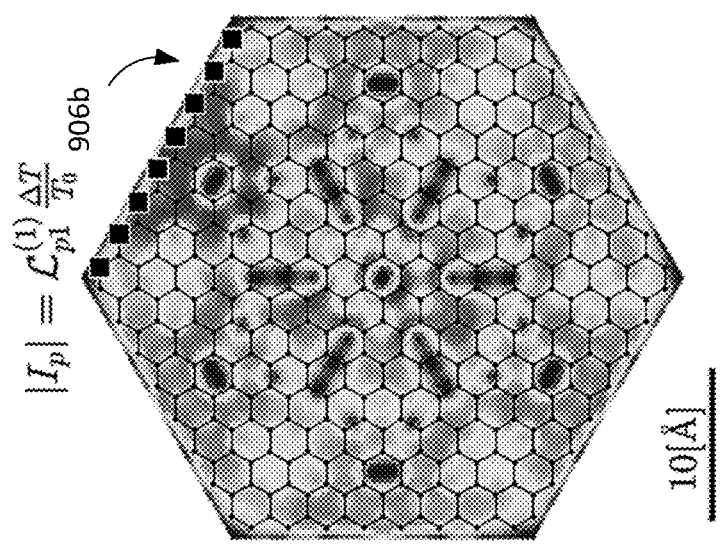
Fig. 9A
Fig. 9B

SCANNING TUNNELING THERMOMETER

CROSS REFERENCE TO RELATED APPLICATIONS

This application claims priority to, and the benefit of, U.S. provisional application entitled "Scanning Tunneling Thermometry Using Electrical Measurements" having Ser. No. 62/642,359, filed Mar. 13, 2018, which is hereby incorporated by reference in its entirety.

STATEMENT REGARDING FEDERALLY SPONSORED RESEARCH OR DEVELOPMENT

This invention was made with government support under Grant No. DE-SC0006699 awarded by the United States Department of Energy. The government has certain rights in the invention.

BACKGROUND

Temperature imaging of nanoscale systems out of equilibrium is a topic that has gained renewed interest due to its myriad technological applications. Nanoscopic cold spots can be used for spot cooling electronic components and controlling local material properties while hot spots could be used for precise activation of chemical or biological reactions. Imaging the temperature fields in quantum coherent conductors can provide a wealth of information on heat flow and dissipation at the nanoscale. However, despite significant technological advances, the spatial resolution of temperature imaging remains in the few nanometers range since probes have to be operated in the contact regime to ensure good thermal contact with the sample. Contact related artifacts and contribution due to different degrees of freedom (phonons, photons and electrons) make it nearly impossible to image the electronic temperature in a quantum coherent conductor.

BRIEF DESCRIPTION OF THE DRAWINGS

Further aspects of the present disclosure will be more readily appreciated upon review of the detailed description of its various embodiments, described below, when taken in conjunction with the accompanying drawings. The components in the drawings are not necessarily to scale, emphasis instead being placed upon clearly illustrating the principles of the present disclosure.

FIGS. 6A, 6B and 7A, 7B illustrate examples of temperature variations on a hexagonal graphene flake with application of a voltage bias and temperature bias, respectively, in accordance with various embodiments of the present disclosure.

FIGS. 9A, 9B and 11A, 11B illustrate examples of tunneling current in a thermoelectric circuit and conductance circuit, respectively, in accordance with various embodiments of the present disclosure.

DETAILED DESCRIPTION

Figure 1:
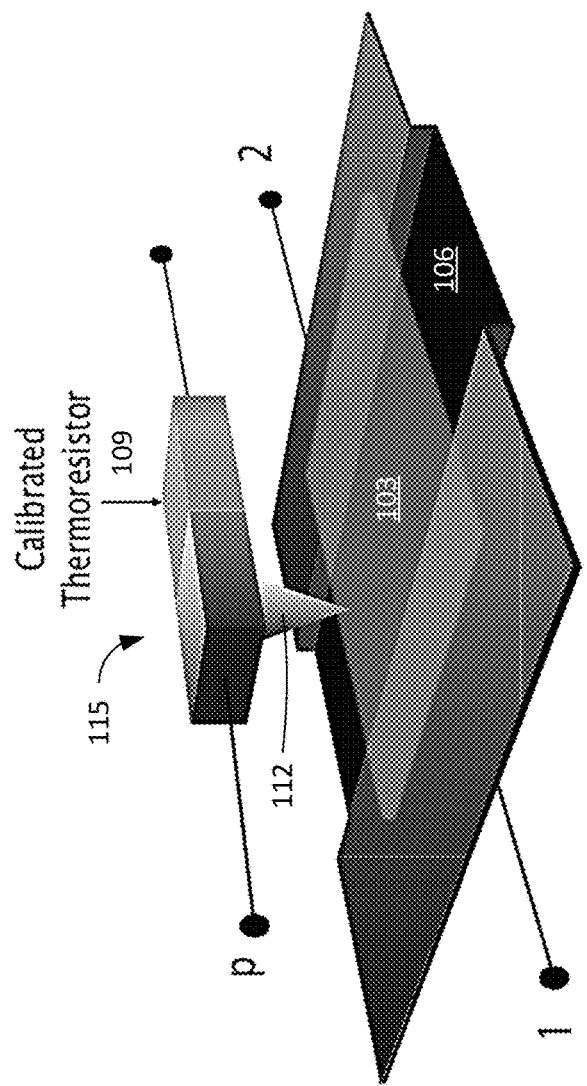
FIG. 1 shows a schematic diagram of a measurement apparatus for scanning tunneling thermometry, in accordance with various embodiments of the present disclosure.

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting, since the scope of the present disclosure will be limited only by the appended claims. It is also possible in the present disclosure that steps can be executed in different sequence where this is logically possible.

In accordance with the purpose(s) of the present disclosure, as embodied and broadly described herein, embodiments of the present disclosure, in some aspects, relate to scanning tunneling thermometry. For example, embodiments of the present disclosure provide for methods and devices for temperature imaging in nanoscale conductors using electrical measurements.

The present disclosure includes a method for imaging temperature fields in nanoscopic quantum conductors, showing improvement in the spatial resolution by over two orders of magnitude over existing methods. Embodiments of the present disclosure include a method for simultaneously measuring conductance and thermopower of a nanostructure by toggling between applying a time modulated voltage to a nanostructure disposed on an interconnect structure or a nanoscale conductor, the time modulated voltage applied at a probe tip positioned over the nanostructure, while measuring a resulting current at a contact of the interconnect structure or nanoscale conductor; and applying a time modulated temperature signal to the nanostructure at the probe tip, while measuring current through a calibrated thermoresistor in series with the probe tip or calibrated calibrated heating elements. Advantageously, the scanning tunneling thermal measurements obtained using the methods and devices described herein can be at or below nanometer resolution and the accuracy is greatly improved over previous scanning thermometry systems.

The following examples are put forth so as to provide those of ordinary skill in the art with a complete disclosure and description of how to perform the methods and use the devices disclosed and claimed herein. Efforts have been made to ensure accuracy with respect to numbers (e.g., amounts, temperature, etc.), but some errors and deviations should be accounted for.

The present disclosure provides for methods and devices that provide contact-free thermal measurements by relying on only electrical measurements. Advantageously, the devices and methods described herein can be used on any quantum coherent conductor, encompassing systems as small as single molecules. Other advantages include the ability to measure thermodynamics in systems or conductors that are out of equilibrium. Such capabilities will be valuable for characterizing electronic device performance in devices using nanotechnology.

Now having described the embodiments of the disclosure, in general, the examples describe some additional embodiments. While embodiments of the present disclosure are described in connection with the example and the corresponding text and figures, there is no intent to limit embodiments of the disclosure to these descriptions. On the contrary, the intent is to cover all alternatives, modifications, and equivalents included within the spirit and scope of embodiments of the present disclosure.

Thermal imaging of nanoscale systems is important not only due to its potential applications, but also because it can greatly enhance the understanding of heat transport at the smallest scales. In recent years, nanoscale thermometry has found application in a wide range of fields including thermometry in a living cell, local control of chemical reactions and temperature mapping of operating electronic devices. Various studies utilize radiation based techniques such as Raman spectroscopy, fluorescence in nanodiamonds and near-field optical microscopy. The spatial resolution of these radiation-based techniques are limited due to optical diffraction and, to overcome this drawback, scanning probe techniques have seen a flurry of activity in recent years. Despite the progress made by scanning probe thermometry, the spatial resolution remains in the sub 10 nm range.

Since temperature and voltage are both fundamental thermodynamic observables, it is instructive to draw the sharp contrast that exists between the measurements of these two quantities at the nanoscale. Scanning probe potentiometry (STP) is a mature technology and can map local voltage variations with sub-angstrom spatial resolution by operating in the tunneling regime. STP has been used to map the local voltage variations in the vicinity of individual scatterers, interfaces or boundaries providing direct observations of the Landauer dipole. STP has been a useful tool in detangling the different scattering mechanisms, and can map local potential variations due to quantum interference effects. Similarly, temperature oscillations due to quantum interference effects have been theoretically predicted for various nanosystems out of equilibrium but have hitherto remained outside the reach of experiment.

Scanning thermal microscopy (SThM) relies on the measurement of a heat-flux related signal that can be sensed based on a calibrated thermocouple or electrical resistor. A good thermal contact between the tip and the sample is needed for an appreciable heat-flux and generally implies a measurement in the contact regime, thus limiting the spatial resolution. Various technical difficulties have been addressed in the measurement such as the parasitic heat transfer through air and the loss of spatial resolution due to the formation of a liquid meniscus at the tip-sample interface. An enhancement in the spatial resolution can be provided by operating the probe in an ultra-high vacuum (UHV) environment, allowing quantitative thermometry with about 10 nm spatial resolution. SThM measurements are typically affected by contact related artifacts, most importantly by an unknown tip-sample thermal resistance which previous studies have attempted to mitigate. Additionally, in SThM measurements on systems out of equilibrium, the tip-sample thermal conductance must be much larger compared to the probe-cantilever conductance which is not easy to achieve. A further concern is that the resulting operation would be invasive (due to the strong thermal coupling between the probe and sample) has also been pointed out. A significant advantage can be achieved by simultaneously probing the time-modulated and time-averaged heat-fluxes on a sample driven out of equilibrium by a time-modulated voltage resulting in a spatial resolution of about 7 nm.

Here, a method is proposed to overcome the most daunting technical challenges of SThM by simultaneously measuring the conductance and thermopower. Using this method, an increase in the spatial resolution of more than two orders of magnitude may be achieved allowing experiments to probe longstanding theoretical predictions on quantum coherent conductors. The method uses standard scanning tunneling microscopy (STM) techniques whose operation in the tunneling regime accounts for the increase in the spatial resolution. The method can be applied to any quantum coherent conductor which encompasses systems from the mesoscopic scale to single molecules. The central assumption for such measurements is the validity of the Wiedemann-Franz (WF) law. The WF law is the statement of a rather simple observation about heat transport in electrical conductors. It asserts that in electrical conductors, heat is carried mainly by the electrons and that therefore electrical conductance (( )) and thermal conductance (K) is related in a material-independent way $\kappa = \sigma L T$, where $L = \pi^2 k_B^2 / 3 e^2$ is a universal constant and T is the temperature. While its applicability in bulk metals has been known for over 150 years, it can be shown to hold true in quantum systems where transport is dominated by elastic processes (see the Supplemental Information below). Experimental verifications of the WF law in atomic contact junctions have recently been presented.

Temperature Measurements

In operating nanoscale devices, it is quite clear that the voltage refers to the electronic voltage since they are the only charged species participating in the transport. However, it is less clear what is meant by a temperature in this context since heat can be carried by other degrees of freedom such as phonons and photons as well. Out of equilibrium, the temperatures of the different degrees of freedom do not coincide. A majority of nanoscale electronic devices operate in the elastic transport regime where electron and phonon degrees of freedom are completely decoupled, and the distinction between their temperatures become extremely important. SThM measurements cannot make this distinction since they rely on measuring heat-flux related signals which carry contributions from all degrees of freedom. The disclosed method provides the much needed characterization of the electronic temperature, decoupled from all other degrees of freedom, thereby providing a vital tool to characterize nonequilibrium (or out of equilibrium) device performance. Henceforth, we refer only to the electronic temperature.

We note a crucial, but often overlooked, theoretical point pertaining to the imaging of temperature fields on a non-equilibrium conductor. The prevailing paradigm for temperature and voltage measurements is the following: (i) a voltage is measured by a probe (voltmeter/thermometer) when in electrical equilibrium and (ii) a temperature is measured when in thermal equilibrium with the sample. This can be referred to as the Engquist-Anderson (EA) definition. However, the fact that the EA definition implicitly ignores thermoelectric effects has been pointed out by Bergfield et al. (see "Probing Maxwell's demon with a nanoscale thermometer, herein incorporated by reference in its entirety" ACS Nano, 7(5):4429-4440, 2013, which is hereby incorporated by reference in its entirety). A joint probe may be used by requiring both electrical and thermal equilibrium with the sample. A temperature probe without electrical equilibrium develops a temperature bias at the probe-sample junction due to the Peltier effect. Similarly, a voltage probe without thermal equilibrium develops a voltage bias at the probe-sample junction due to the Seebeck effect. These errors can be quite large in quantum coherent conductors. A temperature probe therefore has to remain in thermal and electrical equilibrium with the nonequilibrium sample, thereby ensuring true thermodynamic equilibrium of the measurement apparatus with the nonequilibrium sample.

The joint probe measurement can be made mathematically rigorous by showing that the probe equilibration always exists and is unique, arbitrarily far from equilibrium and with arbitrary interactions within the quantum system. Moreover, it was shown that the EA definition is provably nonunique. The value measured by the EA thermometer depends quite strongly on its voltage and conversely, the value measured by the EA voltmeter depends on its temperature. These results are deeply connected to the second law of thermodynamics and expose the fatal flaw in the EA definition. A measurement of temperature therefore also involves a simultaneous measurement of voltage simply due to the fact that electrons carry both charge and heat. This can be expressed as:

$$I_p = J_p = 0, \quad (1)$$

for the simultaneous vanishing of the particle current $I_p$ and the (electronic contribution) to heat current $J_p$.

Temperature Via Electrical Measurement

The measurement operation involves an STM tip scanning the surface of a conductor (or nanostructure) at a constant height in the tunneling regime. Referring to FIG. 1, shown is an example of a measurement apparatus, in accordance with various aspects of the present disclosure. In the example of FIG. 1, a nanostructure 103 is located on an interconnect structure 106 or nanoscale conductor, which is connected to macroscopic reservoirs 1 and 2 that drive the system out of equilibrium using a bias voltage and/or temperature. The temperature and voltage are simultaneously measured to ensure a unique measurement. The thermopower measurement can use a calibrated thermoresistor 109 in series with a scanning tunneling tip 112 or calibrated heaters in the contacts, which is in contact with a macroscopic probe reservoir p. Simultaneous measurement of the conductance and thermopower determines the temperature and voltage in the linear response regime. Measurements made in the tunneling regime result in a dramatic increase in the spatial resolution.

The conductance and thermopower can be simultaneously measured by inducing time-modulated changes in the probe voltage and temperature, respectively. Since the bias voltages and/or temperatures cannot exceed $k_B T_0$ for operation within the linear response regime, such measurements are not at liquid He temperatures. The calculations are at an equilibrium temperature of $T_0 = 100$ K. The method is therefore fully compatible with standard lock-in techniques so as to overcome the noise due to thermal fluctuations at finite operating temperatures. Terminals 1 and 2 in FIG. 1 represent macroscopic reservoirs attached to opposite sides of the interconnect structure 106, while p labels the macroscopic reservoir connected to the STM tip. The nanostructure 103 together with the interconnect structure 106 or nanoscale conductor forms the central system. The resulting open quantum system can be driven out of equilibrium by a bias of the terminals 1 and 2, while the probe 115 is noninvasive due to operation in the tunneling regime. The conductance can be measured by the application of a time-modulated voltage at the probe tip 112 and the resulting current in the macroscopic contacts 1 and 2 is recorded. Similarly, the thermopower is measured by the application of a time-modulated temperature signal at the probe tip 112. The thermopower measurement uses a calibrated thermoresistor 109 in series with the probe tip 112. Although simultaneous measurements of the conductance and thermopower can be made on single molecules using STM-based break junctions, a joint probe can be used for simultaneous temperature and voltage measurements in nonequilibrium samples.

Within the linear response regime, the probe currents depend linearly on the temperature (T) and voltage potential ($\mu$) gradients between the probe p and contact $\alpha$ as:

$$\begin{pmatrix} I_p \\ J_p \end{pmatrix} = \sum_\alpha \begin{pmatrix} \mathcal{L}_{p\alpha}^{(0)} & \mathcal{L}_{p\alpha}^{(1)} \\ \mathcal{L}_{p\alpha}^{(1)} & \mathcal{L}_{p\alpha}^{(2)} \end{pmatrix} \begin{pmatrix} \mu_\alpha - \mu_p \\ \dfrac{T_\alpha - T_p}{T_0} \end{pmatrix}, \quad (2)$$

where $L_{p\alpha}^{(\nu)}$ are the Onsager linear response coefficients evaluated at the equilibrium temperature $T_0$ and chemical potential $\mu_0$. They are related to the electrical conductance, thermopower and thermal conductance of the probe-reservoir junction by:

$$G_{p\alpha}(\mu_0, T_0) = e^2 \mathcal{L}_{p\alpha}^{(0)}(\mu_0, T_0) \quad (3)$$

$$S_{p\alpha}(\mu_0, T_0) = -\frac{\mathcal{L}_{p\alpha}^{(1)}(\mu_0, T_0)}{eT_0 \mathcal{L}_{p\alpha}^{(0)}(\mu_0, T_0)}$$

$$\kappa_{p\alpha}(\mu_0, T_0) = \frac{1}{T_0}\left(\mathcal{L}_{p\alpha}^{(2)}(\mu_0, T_0) - \frac{(\mathcal{L}_{p\alpha}^{(1)})^2}{\mathcal{L}_{p\alpha}^{(0)}}\right).$$

The coefficients $L_{p\alpha}^{(0)}$ and $L_{p\alpha}^{(1)}$ are accessible via electrical measurement whereas:

$$\mathcal{L}_{p\alpha}^{(2)}(\mu_0, T_0) = \frac{\pi^2}{3} k_B^2 T_0^2 \mathcal{L}_{p\alpha}^{(0)}, \quad (4)$$

to leading order in the Sommerfeld series when the transport is elastic. Eq. (4) is the Wiedemann-Franz law.

The exact solution to the Eq. (1) in the linear response regime may be written as:

$$\frac{T_p^{(Exact)}}{T_0} = \frac{\sum_\beta \mathcal{L}_{p\beta}^{(0)} \sum_\alpha \mathcal{L}_{p\alpha}^{(1)} \mu_\alpha - \sum_\beta \mathcal{L}_{p\beta}^{(1)} \sum_\alpha \mathcal{L}_{p\alpha}^{(0)} \mu_\alpha}{\sum_\beta \mathcal{L}_{p\beta}^{(2)} \sum_\alpha \mathcal{L}_{p\alpha}^{(0)} V_\alpha - \left(\sum_\alpha \mathcal{L}_{p\alpha}^{(1)}\right)^2} + \quad (5)$$

$$\frac{1}{T_0} \frac{\sum_\beta \mathcal{L}_{p\beta}^{(0)} \sum_\alpha \mathcal{L}_{p\alpha}^{(2)} T_\alpha - \sum_\beta \mathcal{L}_{p\beta}^{(1)} \sum_\alpha \mathcal{L}_{p\alpha}^{(1)} T_\alpha}{\sum_\beta \mathcal{L}_{p\beta}^{(2)} \sum_\alpha \mathcal{L}_{p\alpha}^{(0)} - \left(\sum_\alpha \mathcal{L}_{p\alpha}^{(1)}\right)^2}.$$

The disclosed method relies on the WF law given by Eq. (4), and to leading order in the Sommerfeld expansion it provides:

$$\frac{T_p^{(WF)}}{T_0} = \frac{3}{\pi^2 k_B^2 T_0^2} \left( \frac{\sum_\alpha \mathcal{L}_{p\alpha}^{(1)} \mu_\alpha}{\sum_\alpha \mathcal{L}_{p\alpha}^{(0)}} - \frac{\sum_\alpha \mathcal{L}_{p\alpha}^{(1)}}{\sum_\alpha \mathcal{L}_{p\alpha}^{(0)}} \frac{\sum_\beta \mathcal{L}_{p\beta}^{(0)} \mu_\beta}{\sum_\beta \mathcal{L}_{p\beta}^{(0)}} \right) + \frac{\sum_\alpha \mathcal{L}_{p\alpha}^{(0)} T_\alpha}{T_0 \sum_\alpha \mathcal{L}_{p\alpha}^{(0)}}. \quad (6)$$

$T_p^{(WF)}$ needs only the measurement of $L_{p\alpha}^{(0)}$ and $L_{p\alpha}^{(1)}$ and lends itself to a simple interpretation. The first term in Eq. (6) is the thermoelectric contribution whereas the second term is the thermal contribution. It differs from $T_p^{(Exact)}$ by:

$$T_p^{(WF)} = T_p^{(Exact)} + T_p^{(Exact)} O((k_B T_0/\Delta)^2), \quad (7)$$

only at the second order of the Sommerfeld series, which is typically very small.

The simultaneous measurement of the electrical conductance and thermopower therefore determine both temperature and voltage, since the thermal conductance is simply related to the electrical conductance by the WF law. The method thus offers two distinct advantages over existing SThM schemes, namely, (i) significantly enhanced spatial resolution due to measurement in the tunneling regime and (ii) the WF law relates precisely the electronic contribution to the heat flow, thereby providing a much needed tool to characterize the electronic temperature decoupled from all other degrees of freedom. Knowing separately the electronic contribution to heat current is vital for the characterization of nonequilibrium device performances where electrons are the working fluid.

Figure 2B:
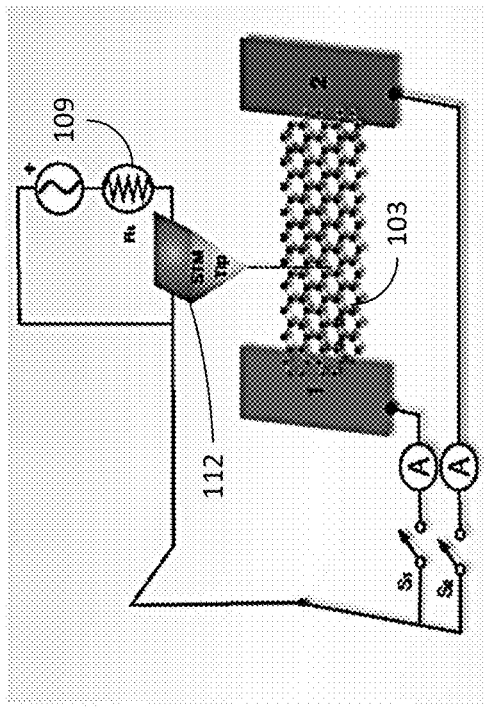
FIGS. 2A and 2B are schematic diagrams illustrating examples of conductance and thermopower measurements using the measurement apparatus of FIG. 1, in accordance with various embodiments of the present disclosure.
Figure 2A:
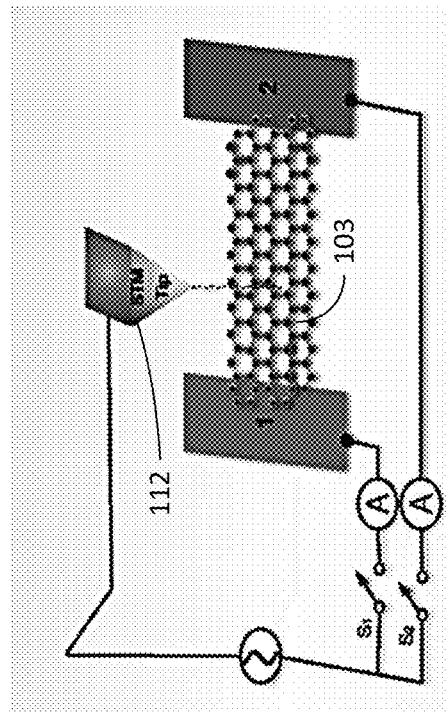

Temperature and voltage measurements on the system are equivalent to the determination of $L_{p\alpha}^{(0)}$ and $L_{p\alpha}^{(1)}$ (equivalently conductance and thermopower) and can be measured simultaneously by a simply toggling between two circuit operations shown in FIGS. 2A and 2B. FIGS. 2A and 2B are schematic diagrams illustrating examples of the conductance and thermopower, respectively, or equivalently the $L_{p\alpha}^{(0)}$ and $L_{p\alpha}^{(1)}$ coefficients, which can be measured simultaneously by toggling between the two circuits. The $L_{p\alpha}^{(0)}$ coefficient is measured by applying a time-modulated voltage at the probe reservoir α and recording the resulting current at the reservoir α while all other reservoirs are disconnected using switches, as depicted in FIG. 2a. For example, $L_{p\alpha}^{(0)}$ can be measured with switch S1 ON and switch S2 OFF. The $L_{p\alpha}^{(1)}$ ent can be measured by inducing a time-modulated temperature variation in the probe 115 and recording the current in reservoir α while all other reservoirs are disconnected using the switches, as depicted in FIG. 2B.

In the first circuit of FIG. 2A, the $L_{p\alpha}^{(0)}$ coefficient can be measured by the application of an AC voltage bias $V(\omega) = V_p(\omega) - V_\alpha$ across the probe and reservoir α and the current is measured at frequency ω using a lock-in amplifier such that:

$$I_\alpha = \mathcal{L}_{p\alpha}^{(0)} (\mu_p - \mu_\alpha) = -I_p,$$

$$I_\alpha(\omega) = e \mathcal{L}_{p\alpha}^{(0)} V(\omega). \quad (8)$$

The switches ($S_1$ and/or $S_2$) can be used to toggle between the different reservoirs α as shown in FIGS. 2A and 2B. The measurement of the $L_{p\alpha}^{(1)}$ coefficient uses the calibrated thermoresistor 109 in series with the probe tip 112 or calibrated heaters in the contacts. An AC voltage at frequency ω induces temperature variations at frequency 2ω due to Joule heating, and the resulting current in reservoir α (at frequency 2ω) is then measured as:

$$I_\alpha = \mathcal{L}_{p\alpha}^{(1)} \frac{(T_p - T_\alpha)}{T_0} \quad (9)$$

$$I_\alpha(2\omega) = \mathcal{L}_{p\alpha}^{(1)} \frac{T_p(2\omega)}{T_0}.$$

The measurements involve changing the probe bias conditions and constitute a noninvasive measurement since the probe 115 is operated in the tunneling regime. Since the resulting currents are affected by the probe-reservoir bias amplitudes, their values can be chosen such that the currents are resolvable. Charge currents of a few hundred pA are quite easily measured with lock-in techniques. The method therefore works well with typical voltage and temperature biases for most conductors.

Results

Figure 3B:
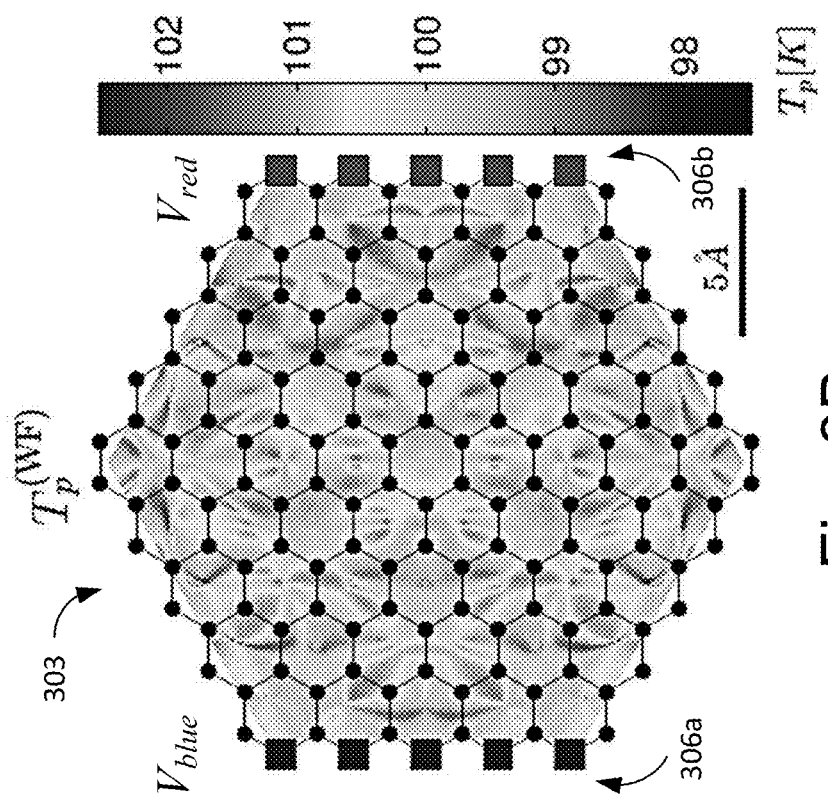
FIGS. 3A, 3B and 4A, 4B illustrate examples of temperature variations on a hexagonal graphene flake with application of a voltage bias and temperature bias, respectively, in accordance with various embodiments of the present disclosure.
Figure 3A:
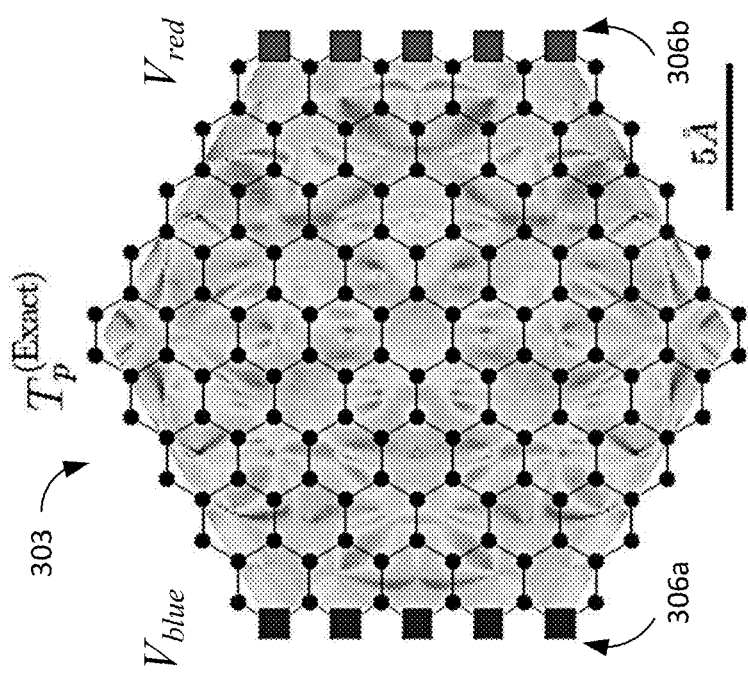

Examples of various measurements using the measurement apparatus of FIG. 1 are now presented with respect to FIGS. 3A-3B and 4A-4B. FIGS. 3A and 3B illustrate an example of temperature variations on a hexagonal graphene flake 303 with an application of a voltage bias $V_{306a} - V_{306b} = 5$ mV, where the squares 306 on opposite sides of the graphene flake 303 indicate the sites corresponding to the carbon atoms of graphene bonded (or coupled) to the interconnect structure 106 (FIG. 1). FIG. 3A shows the exact linear response solution given in Eq. (5) while FIG. 3B shows the approximate solution obtained by employing the WF law given in Eq. (6). The same temperature scale was used for both panels.

Temperature variations of about 5 K are seen within the nanostructure and clearly demonstrate the quantum coherent nature of transport. The agreement between $T_p^{(Exact)}$ and $T_p^{(WF)}$ given by Eqs. (5) and (6) respectively is exceptional. However, closer inspection of the figure reveals that the hottest spots recorded in $T_p^{(WF)}$ (electrically measurable) is slightly hotter than the ones given by the exact solution $T_p^{(Exact)}$. Similarly, the coldest spots in the disclosed method are slightly colder than the ones given by the exact solution. In particular, $T_p^{(WF)}$ very slightly overestimates the hottest spots and underestimates the coldest spots, while the intermediate temperatures agree exceptionally well.

The discrepancies between the two measurements are due to higher order contributions in the Sommerfeld series [cf. Eq. (7)] and are very small. These discrepancies can be made even smaller by operation at lower temperatures. It should be noted that the temperature variations shown in FIGS. 3A and 3B are solely the result of the voltage bias and are given by the first term in Eq. (6). Since the variations are purely due to the thermoelectric effect, the EA probe would have noted no temperature variations at all.

Figure 4B:
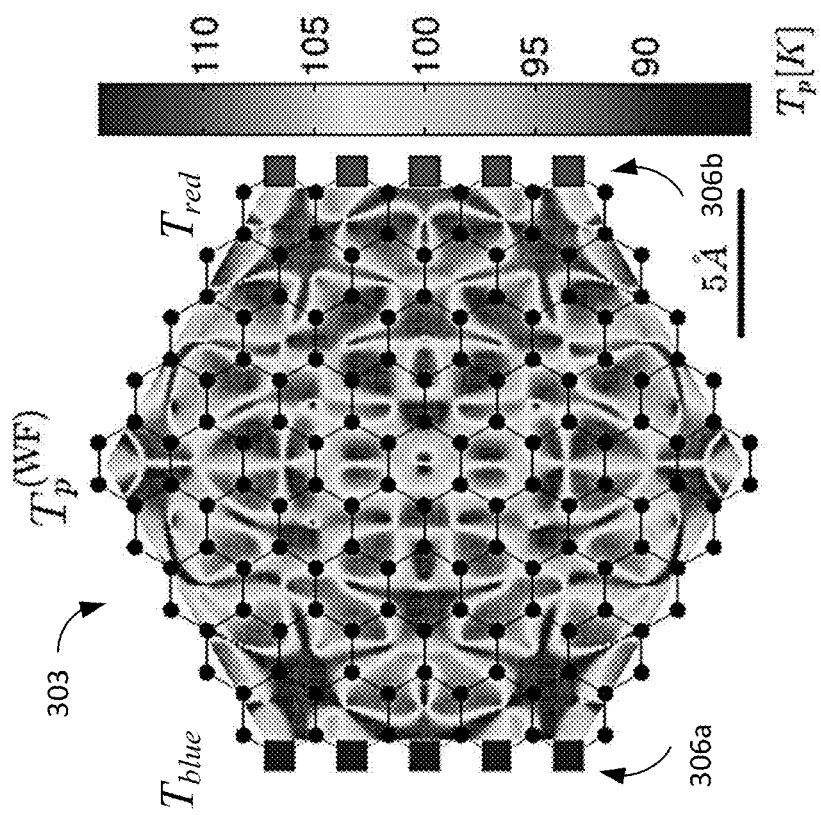
Figure 4A:
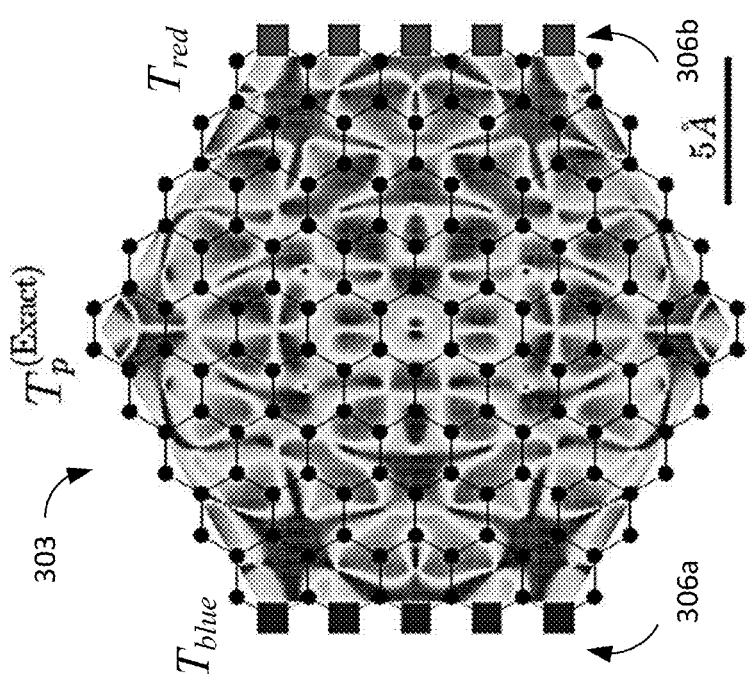

FIGS. 4A and 4B illustrate an example of temperature variations on the hexagonal graphene flake 303 with an application of a temperature bias $T_{306b} - T_{306a} = 30$ K at $T_0 = 100$ K, where the squares 306 on the opposite sides of the graphene flake 303 indicate the sites corresponding to the carbon atoms of graphene bonded (or coupled) to the interconnect structure 106 (FIG. 1). FIG. 4A shows the exact linear response solution given in Eq. (5) while FIG. 4B shows the WF solution given by Eq. (6). The same temperature scale is used for both panels.

The temperature variations of about 30 K clearly demonstrate the nonclassical nature of heat transport at the nanoscale. The agreement between $T_p^{(Exact)}$ and $T_p^{(WF)}$ given by Eqs. (5) and (6) respectively is still extremely good. Once again, closer inspection of FIGS. 4A and 4B reveals that the hottest spots recorded in $T_p^{(WF)}$ (electrically measurable) is slightly hotter than the ones given by the exact solution $T_p^{(Exact)}$. Similarly, the coldest spots in the disclosed method are slightly colder than the ones given by the exact solution. In particular, $T_p^{(WF)}$ very slightly over estimates the hottest spots and underestimates the coldest spots while the intermediate temperatures agree exceptionally well.

The discrepancies between the two measurements are due to higher order in the Sommerfeld series [cf. Eq. (7)] and are very small. These discrepancies can be made even smaller by operation at lower temperatures. It should be noted that the temperature variations shown here are solely the result of the temperature bias and are given by the first term in Eq. (6). The EA probe gives the correct result for this situation.

Supplemental Information

Elastic Transport Theory.

The steady-state currents flowing into reservoir p, through a quantum conductor where elastic processes dominate the transport, can be written in a form analogous to the multi-terminal Buttiker formula:

$$I_p^{(v)} = \frac{1}{h} \sum_\alpha \int_{-\infty}^{\infty} d\omega (\omega - \mu_p)^v \mathcal{T}_{p\alpha}(\omega)[f_\alpha(\omega) - f_p(\omega)], \quad (10)$$

$$\text{where: } \mathcal{T}_{p\alpha}(\omega) = Tr\{\Gamma^p(\omega)G^r(\omega)\Gamma^\alpha(\omega)G^a(\omega)\}, \quad (11)$$

is the transmission probability for an electron originating in reservoir α to tunnel into reservoir p. The notation uses v=0 to refer to the electron number current ($I_p$ above) and v=1 to refer to the electronic contribution to the heat current ($J_p$ above). Within the linear response regime $$I_p^{(v)} = \sum_{\alpha=1}^{M} \left[ \mathcal{L}_{p\alpha}^{(v)}(\mu_p - \mu_\alpha) + \frac{\mathcal{L}_{p\alpha}^{(v+1)}}{T_0}(T_p - T_\alpha) \right], \quad (12)$$

$$\mathcal{L}_{p\alpha}^{(v)} \equiv \mathcal{L}_{p\alpha}^{(v)}(\mu_0, T_0) \quad (13)$$

$$= \frac{1}{h} \int_{-\infty}^{\infty} d\omega (\omega - \mu_0)^v \mathcal{T}_{p\alpha}(\omega) \left( -\frac{\partial f_0}{\partial \omega} \right),$$

are evaluated at the mean chemical potential $\mu_0$ and mean temperature $T_0$ and $f_0$ is the Fermi-Dirac distribution at the mean value. Thermal transport at room temperature is well within the linear response regime and, in many experiments currently performed in labs, the mesoscopic systems at room temperature are dominated by elastic transport.

The Sommerfeld series for the $T_{p\alpha}^{(v)}$ coefficients are as follows:

$$\mathcal{L}_{p\alpha}^{(0)} = \mathcal{T}_{p\alpha}(\mu_0) + 2\theta(2)T_0^2 \mathcal{T}_{p\alpha}^{(2)} + 2\theta(4)T_0^4 \mathcal{T}_{p\alpha}^{(4)}(\mu_0) + \dots$$

and $$\mathcal{L}_{p\alpha}^{(1)} = 4\theta(2)T_0^2 \mathcal{T}_{p\alpha}^{(1)}(\mu_0) + 8\theta(4)T_0^4 \mathcal{T}_{p\alpha}^{(3)}(\mu_0) + 12\theta(6)T_0^6 \mathcal{T}_{p\alpha}^{(5)}(\mu_0) + \dots$$

and $$\mathcal{L}_{p\alpha}^{(2)} = 4\theta(2)T_0^2 \mathcal{T}_{p\alpha}(\mu_0) + 24\theta(4)T_0^4 \mathcal{T}_{p\alpha}^{(2)}(\mu_0) + 60\theta(6)T_0^6 \mathcal{T}_{p\alpha}^{(4)}(\mu_0) + \dots$$

where θ is a numerical factor and relates to the Riemann-Zeta function:

$$\Theta(k+1) = \left(1 - \frac{1}{2^k}\right)\zeta(k+1),$$

explicitly:

$$\Theta(2) = \frac{\pi^2}{12}$$

$$\Theta(4) = \left(\frac{7}{8}\right)\frac{\pi^4}{90}$$

$$\Theta(6) = \left(\frac{31}{32}\right)\frac{\pi^6}{945}.$$

The transmission function has appreciable changes on an energy scale determined by the system's Hamiltonian and its couplings to the interconnect. Thus, the characteristic energy scale Δ is defined as: $\mathcal{T}_{p\alpha}$ $$\mathcal{T}_{p\alpha} = \Delta^2 \mathcal{T}_{p\alpha}^{(2)}, \quad (14)$$

which is typically much larger than the thermal energy $k_B T_0$. The following relation connecting $L_{p\alpha}^{(2)}$ and $L_{p\alpha}^{(0)}$ is the Wiedemann-Franz law:

$$\mathcal{L}_{p\alpha}^{(2)} = \frac{\pi^2}{3} k_B^2 T_0^2 \mathcal{L}_{p\alpha}^{(0)}(1 + O((k_B T_0/\Delta)^2)). \quad (15)$$

The System Hamiltonian.

A hexagonal graphene flake is shown connected to the interconnect structure 106 (FIG. 1) at the sites represented by the squares 306 in FIGS. 3A-3B and 4A-4B, and the interconnect structure 106 is in contact with macroscopic reservoirs 1 and 2 whose bias conditions can be adjusted. The strong coupling of the system to the macroscopic reservoirs creates an open quantum system with energy level broadenings, which can be described by the tunneling-width matrices $\Gamma^\alpha$. The Hamiltonian of the graphene flake can be described within Hückel theory as:

$$H = -\sum_{\langle i,j \rangle} t_{ij} d_i^\dagger d_j + h.c, \quad (16)$$

with nearest-neighbor interaction t=−2.7 eV. The tunneling-width matrix is nonzero only at the sites shown by the squares 306 and is diagonal in the basis of atomic orbitals $\Gamma_{bb}^1 = 0.5$ cV=$\Gamma_{rr}^2$ where b and r represent atomic orbitals shown by squares 306a and 306b, respectively. The equilibrium chemical potential is set to $\mu_0 = -1.2$ eV with respect to the onsite energy, while the equilibrium temperature $T_0 = 100$ K, and the STM tip is scanned at a height of 3.5 Å above the plane of the nanostructure 103 (FIG. 1).

Temperature from Tunneling Currents

It is possible to realize the operation of the scanning tunneling thermometer (STT) in other ways. For example, one alternative is to calibrate the heating elements in the contact reservoirs themselves. Within the linear response regime, the probe currents depend linearly on the temperature (T) and voltage (V) gradients between the probe p and contact α as:

$$\begin{pmatrix} I_p \\ J_p \end{pmatrix} = \sum_\alpha \begin{pmatrix} \mathcal{L}_{p\alpha}^{(0)} & \mathcal{L}_{p\alpha}^{(1)} \\ \mathcal{L}_{p\alpha}^{(1)} & \mathcal{L}_{p\alpha}^{(2)} \end{pmatrix} \begin{pmatrix} V_\alpha - V_p \\ \dfrac{T_\alpha - T_p}{T_0} \end{pmatrix}, \quad (17)$$

where the $L_{p\alpha}^{(\nu)}$ are the Onsager linear response coefficients evaluated at the equilibrium temperature $T_0$ and chemical potential $\mu_0$. $L_{p\alpha}^{(0)}$ is the electrical conductance ($L_{p\alpha}^{(0)} = G_{p\alpha}$) between the probe p and contact $\alpha$. $L_{p\alpha}^{(1)}$ is related to the thermal conductance ($L_{p\alpha}^{(1)} = -T_0 S_{p\alpha} G_{p\alpha}$) up to the leading order in the Sommerfeld series (see additional Supplemental Information below).

Solving for the temperature of the STT in Eq. (1) gives:

$$\frac{T_p^{(Exact)}}{T_0} = \frac{\sum_\beta \mathcal{L}_{p\beta}^{(0)} \sum_\alpha \mathcal{L}_{p\alpha}^{(1)} V_\alpha - \sum_\beta \mathcal{L}_{p\beta}^{(1)} \sum_\alpha \mathcal{L}_{p\alpha}^{(0)} V_\alpha}{\sum_\beta \mathcal{L}_{p\beta}^{(2)} \sum_\alpha \mathcal{L}_{p\alpha}^{(0)} - \left(\sum_\alpha \mathcal{L}_{p\alpha}^{(1)}\right)^2} + \frac{1}{T_0} \frac{\sum_\beta \mathcal{L}_{p\beta}^{(0)} \sum_\alpha \mathcal{L}_{p\alpha}^{(2)} T_\alpha - \sum_\beta \mathcal{L}_{p\beta}^{(1)} \sum_\alpha \mathcal{L}_{p\alpha}^{(1)} T_\alpha}{\sum_\beta \mathcal{L}_{p\beta}^{(2)} \sum_\alpha \mathcal{L}_{p\alpha}^{(0)} - \left(\sum_\alpha \mathcal{L}_{p\alpha}^{(1)}\right)^2}. \quad (18)$$

Here $T_p^{(Exact)}$ denotes the exact solution to the equilibration of the STT, i.e., Eq. (1), within the linear response regime where the currents are expressed by Eq. (17).

Eq. (17) suggests that $L_{p\alpha}^{(0)}$ and $L_{p\alpha}^{(1)}$ can be measured using the tunneling current $I_p$, whereas $L_{p\alpha}^{(2)}$ appears only in the expression for the heat current $J_p$ and would generally involve the measurement of a heat-flux-related signal. However, for systems obeying the WF law, it is possible to simply relate $L_{p\alpha}^{(0)}$ and $L_{p\alpha}^{(2)}$ using $$\mathcal{L}_{p\alpha}^{(2)} = \frac{\pi^2 k_B^2 T_0^2}{3e^2} \mathcal{L}_{p\alpha}^{(0)}, \quad (19)$$

valid up to leading order in the Sommerfeld series. This allows $L_{p\alpha}^{(2)}$ to be inferred using the WF law given by Eq. (19), which obtains:

$$\frac{T_p^{(WF)}}{T_0} = \frac{3e^2}{\pi^2 k_B^2 T_0^2} \left( \frac{\sum_\alpha \mathcal{L}_{p\alpha}^{(1)} V_\alpha}{\sum_\alpha \mathcal{L}_{p\alpha}^{(0)}} - \frac{\sum_\alpha \mathcal{L}_{p\alpha}^{(1)} \sum_\beta \mathcal{L}_{p\beta}^{(0)} V_\beta}{\sum_\alpha \mathcal{L}_{p\alpha}^{(0)} \sum_\beta \mathcal{L}_{p\beta}^{(0)}} \right) + \frac{\sum_\alpha \mathcal{L}_{p\alpha}^{(0)} T_\alpha}{T_0 \sum_\alpha \mathcal{L}_{p\alpha}^{(0)}}, \quad (20)$$

valid up to leading order in the Sommerfeld series.

$T_p^{(WF)}$ needs only the measurement of $L_{p\alpha}^{(0)}$ and $L_{p\alpha}^{(1)}$, or equivalently, the electrical conductance and thermopower, and lends itself to a simple interpretation: The first term in Eq. (20) is the thermoelectric contribution whereas the second term is the thermal contribution. The second-order corrections in the Sommerfeld series are typically very small $$T_p^{(WF)} = T_p^{(Exact)}(1 + \mathcal{O}((k_B T_0/\Delta)^2)), \quad (21)$$

where the characteristic energy scale of the problem $\Delta$ is typically much larger than the thermal energy set by $k_B T_0$: e.g., $\Delta = \in_F$, the Fermi energy, for bulk systems and for a tunneling probe $\Delta$ is of the order of the work function. The breakdown of the Wiedemann-Franz law has been reported in various nanoscale systems. The characteristic energy scale $\Delta$ in such cases is comparable to the thermal energy thereby leading to large errors in the Sommerfeld series expansion in Eq. (21). The breakdown of the WF law was reported in graphene. Here, the local chemical potential was tuned (via local doping) such that it is smaller than the thermal energy thereby creating the so-called Dirac fluid. Such systems show a decoupling of charge and heat currents, making it impossible to measure heat currents through electrical means. Although the results apply to a broad array of nanoscale conductors, they do not apply to systems prepared in this manner.

It is clear from Eq. (20) that the measurement of (a) conductance $L_{p\alpha}^{(0)}$ and the thermoelectric coefficient $L_{p\alpha}^{(1)}$ along with the (b) known bias conditions of the system $\{V_\alpha, T_\alpha\}$ completely determine the conditions under which the STT is in local thermodynamic equilibrium with the system.

Experimental Implementation

Figure 5A:
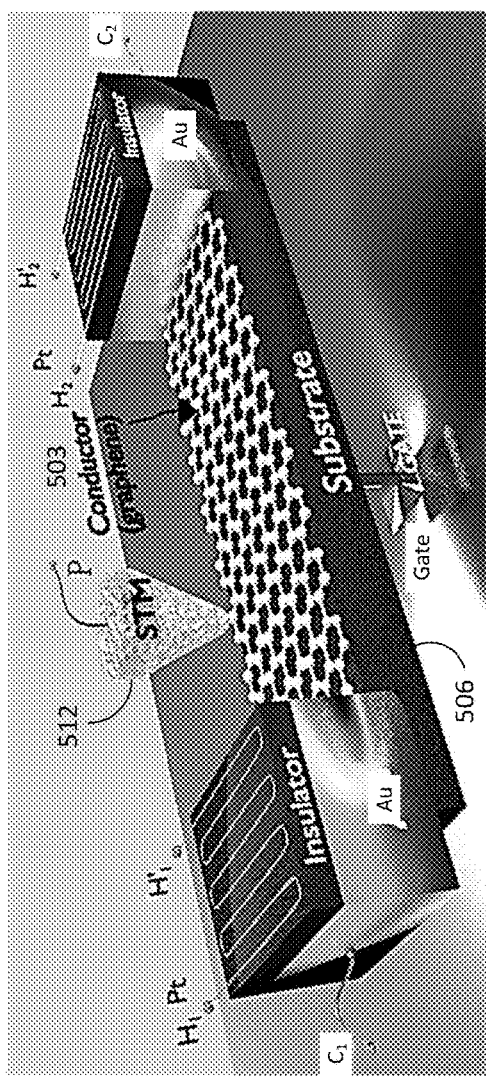
FIGS. 5A-5C are schematic diagrams illustrating an example of conductance and thermopower measurements using a measurement apparatus, in accordance with various embodiments of the present disclosure.
Figure 5C:
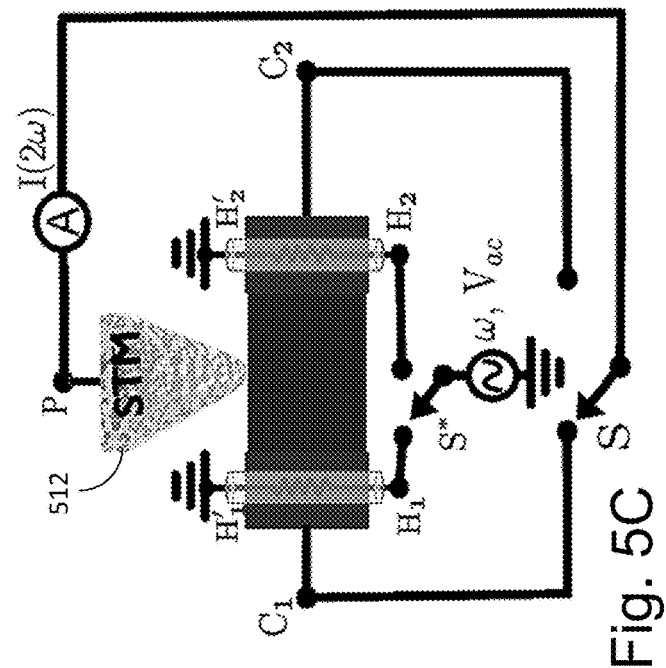
Figure 5B:
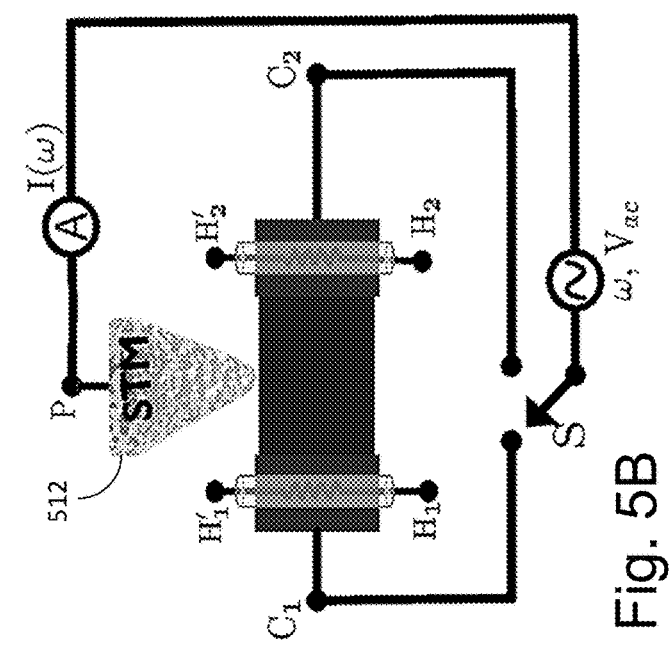

Referring to FIG. 5A, shown is a schematic depiction of an example of the system and measurement apparatus. An STM tip 512 scans the surface of a nanoscale conductor 503 at a fixed height. The conductor 503 sits on top of a substrate 506 which may be gated. Two gold contacts $C_1$ and $C_2$ are connected to the conductor 503 on either side. A Pt heater ($H_1$–$H'_1$ and $H_2$–$H'_2$) sitting atop each gold contact, and electrically insulated from it, allows for modulation of the temperature of the gold contacts $C_1$ and $C_2$. In FIG. 5B, the conductance circuit which measures the coefficient $L_{p\alpha}^{(0)}$ for each contact $\alpha$ selected using switch S. In FIG. 5C, the thermoelectric circuit which measures the coefficient $L_{p\alpha}^{(1)}$ for each contact $\alpha$. Switch S* activates the heater in the corresponding contact $\alpha$ selected by switch S.

The temperature measurement involves two circuits: (I) The conductance circuit which measures the electrical conductance $L_{p\alpha}^{(0)}$ and (II) The thermoelectric circuit which measures the thermoelectric response coefficient $L_{p\alpha}^{(1)}$, as shown in FIGS. 5B and 5C respectively. The STT involves operating the tip 512 of a scanning tunneling microscope (STM) at a constant height above the surface of the conductor 503 in the tunneling regime. The circuit operations (I) and (II) are described.

(I) The conductance circuit involves a closed circuit of the probe 512 and the contact $\alpha$. All contacts and the probe 512 are held at the equilibrium temperature $T_\alpha = T_p = T_0$. An AC voltage $V(\omega)$ is applied at the probe-contact junction $V(\omega) = V_p - V_\alpha$ and the resulting tunneling current $I_p(\omega)$ is recorded using standard lock-in techniques. The STM tip 512 is scanned along the surface. A switch disconnects all contacts except $\alpha$ and the tunneling current is therefore $$I_p = \mathcal{L}_{p\alpha}^{(0)}(V_p - V_\alpha) = -I_\alpha,$$

$$I_p(\omega) = \mathcal{L}_{p\alpha}^{(0)} V(\omega). \quad (22)$$

The procedure is repeated for all the contacts $\alpha$ by toggling the switch S shown in FIG. 5B and a scan is obtained for each probe-contact junction. This completes the measurement of the conductance $L_{p\alpha}^{(0)}$ for all the contacts $\alpha$.

(II) The thermoelectric circuit involves a (i) closed circuit of the probe 512 and contact $\alpha$, which is the same as the conductance circuit without the voltage source, and (ii) an additional circuit which induces time-modulated temperature variations in contact $\alpha$; An AC current at frequency $\omega$ induces Joule heating in the Pt resistor at frequency $2\omega$ and results in a temperature modulation $T_\alpha = T_0 + \Delta T_\alpha(2\omega)$ in the contact $\alpha$. The probe 512 is held at the equilibrium temperature $T_p=T_0$. The resulting tunneling current $I_p(2\omega)$, at frequency $2\omega$, is recorded using standard lock-in techniques. The STM tip 512 is scanned along the surface at the same points as before. A switch disconnects all contacts except $\alpha$ and the tunneling current is $$I_p = \mathcal{L}_{p\alpha}^{(1)} \frac{(T_\alpha - T_p)}{T_0} = -I_\alpha$$

$$I_p(2\omega) = \mathcal{L}_{p\alpha}^{(1)} \frac{\Delta T_\alpha(2\omega)}{T_0}.$$
(23)

The procedure is repeated for all the contacts $\alpha$ by toggling the switches S and S* shown in FIG. 5C and a scan is obtained for each probe-contact junction. Note that the switch S* must heat the Pt resistor in the same contact $\alpha$ for which the probe-contact tunneling current is measured. This completes the measurement of the thermoelectric coefficient $L_{p\alpha}^{(1)}$ for all the contacts $\alpha$.

Heating elements were fabricated in the contacts. Any system where one may induce Joule heating can be used as the heating element (instead of Pt) in the circuit. For example, another flake of graphene could be used as a heating element as long as it is calibrated accurately. The voltage modulation frequency in the heating elements $\omega \ll 1/\tau$, where $\tau$ is the thermal time constant of the contacts, so that the contact may thermalize with the heating element. Typically, $\tau$ is of the order of tens of nanoseconds. Discussion of the calibration of the contact temperature $T_\alpha = T_0 + \Delta T_\alpha$ in the additional Supplemental Information. The thermoelectric response of the nanosystem may be quite sensitive to the gate voltage which is also discussed in the additional Supplemental Information.

Results

Model temperature measurements are presented for a hexagonal graphene flake under (a) a thermal bias and (b) a voltage bias. The measured temperature, for a combination of thermal and voltage biases, would simply be a linear combination of the two scenarios (a) and (b) in the linear response regime (under identical gating conditions). Therefore, the two cases are presented separately but it should be noted that the gate voltages are not the same for the two scenarios that are presented here. The voltage bias case has been gated differently so as to enhance the thermoelectric response of the system. The temperature measurement is shown for (a) the thermal bias case in FIGS. 6A and 6B, and (b) the voltage bias case in FIGS. 7A and 7B. The two panels in FIGS. 6A-6B and 7A-7B compare (1) the temperature measurement $T_p^{(Exact)}$ obtained from the exact solution [given by Eq. (18)] and (2) the temperature measurement $T_p^{(WF)}$ obtained from the method [given by Eq. (20)] which relies on the WF law.

FIGS. 6A and 6B illustrate examples of temperature variations on a hexagonal graphene flake with an application of a symmetrical temperature bias $T_{hot}-T_{cold}=0.5$ K, where the hot and cold squares indicate the sites coupled to the contacts; $T_0=4$ K. FIG. 6A shows the exact linear response solution given in Eq. (18) while FIG. 6B shows the WF solution given by Eq. (20). The same temperature scale is used for both panels.

FIGS. 7A and 7B illustrate examples of temperature variations on a hexagonal graphene flake with an application of a voltage bias $V_{606a}-V_{606b}=k_B T_0/e=0.34$ mV, where the squares 606 indicate the sites coupled to the contacts; $T_0=4$ K. FIG. 7A shows the exact linear response solution given in Eq. (18) while FIG. 7B shows the approximate solution obtained by employing the WF law given in Eq. (20). The same temperature scale is used for both panels.

Graphene is highly relevant for future electronic technologies and provides a versatile system whose transport properties can be tuned by an appropriate choice of the gate voltage, therefore the results for graphene are illustrated. The method itself is valid for any system obeying the WF law. The thermoelectric response coefficient $L_{p\alpha}^{(1)} \sim T_0^2$ has a quadratic suppression at low temperatures and its measurement from Eq. (23) depends on the choice of gating especially at cryogenic operating temperatures about 4 K since the resulting tunneling current must be experimentally resolvable. In graphene, it was found that the electrical tunneling currents arising from its thermoelectric response are resolvable even at cryogenic temperatures when the system is gated appropriately and, owing to the fact that a number of STM experiments are conducted at low temperatures, the results are presented for $T_0=4$ K. Higher operating temperatures result in a higher tunneling current in Eq. (23) and gating would therefore be less important.

The $\pi$-electron system of graphene was described using the tight-binding model whose basis states are $2p_z$ orbitals at each atomic site of carbon. The STT was modeled as an atomically sharp Pt tip operating at a constant height of 3 Å above the plane of the carbon nuclei. The details of the graphene Hamiltonian as well as the probe-system tunnel coupling are presented below. The atomic sites of graphene which are coupled to the contacts are indicated in FIGS. 6A-6B and 7A-7B by squares 606. The chemical potential and temperature of the two contacts 606a and 606b set the bias conditions for the problem. The coupling to the two contacts is symmetrical and the coupling strength for all the coupling sites is taken as $\Gamma=0.5$ eV. Additional details regarding the gating and the tunneling currents are included in the additional Supplemental Information.

FIGS. 6A and 6B show the variations in temperature for a symmetrical $(T_{606b}-T_{606a}=2T_0$ temperature bias $T_{606b}-T_{606a}=0.5$ K. The agreement between $T_p^{(Exact)}$ and $T_p^{(WF)}$ given by Eqs. (18) and (20) respectively is excellent. The gating was chosen to be $\mu_0=-2.58$ eV with respect to the Dirac point in graphene. The same temperature scale was used for both FIGS. 6A and 6B. The temperature variations in $T_p^{(WF)}$ are solely the result of the temperature bias and are given by the second term in Eq. (20). Therefore, only the measurement of the conductances $L_{p\alpha}^{(0)}$ is needed for the temperature measurement under these bias conditions. Consider a contact tip voltage modulation of 1 mV for the measurement of the conductance. The resulting tunneling currents are of the order of 10 nA with a maximum tunneling current of about 30 nA. Details in the additional Supplemental Information.

FIGS. 7A and 7B show the variations in temperature for a voltage bias of $V_{606a}-V_{606b}=k_B T_0/e$, with $T_0=4$ K, so that the transport is within the linear response regime. The gating for this case has been chosen to be $\mu_0=-2.28$ eV such that there is an enhanced thermoelectric effect. The tunneling currents from the thermoelectric circuit, under these gating conditions, are of the order of 100 pA with a maximum tunneling current of about I=150 pA and are resolvable under standard lock-in techniques. The variation of the contact temperature is taken to be $\Delta T=(10\%)T_0$ with $T_0=4$ K. The resolution of the tunneling current is an important point especially for the measurement of the thermoelectric response coefficient $L_{p\alpha}^{(1)}$ and has been covered in greater detail in the additional Supplemental Information. The same temperature scale is used for both FIGS. 7A and 7B and there is excellent agreement between $T_p^{(Exact)}$ and $T_p^{(WF)}$.

The temperature variations shown here are solely the result of the voltage bias and are given by the first term in Eq. (20). Since the variations are purely due to the thermoelectric effect, the EA definition would have noted no temperature variations at all.

The disagreement between the exact solution and the method are due to higher-order contributions in the Sommerfeld series which are extremely small [cf. Eq. (21)]. An explicit expression for the first Sommerfeld correction in the WF law has been derived in the additional Supplemental Information. The discrepancy between $T_p^{(WF)}$ and $T_p^{(Exact)}$ defined by $[T_p^{(WF)} - T_p^{(Exact)}]/T_p^{(Exact)}$ is less than 0.01% for the temperature bias case in FIGS. 6A and 6B, whereas their discrepancy for the voltage bias case in FIGS. 7A and 7B is less than 0.2%.

System Hamiltonian

The π-electron system of graphene is described within the tight-binding model, $H_{gra} = \Sigma_{<i,j>} t_{ij} d_i^\dagger d_j + h.c$, with nearest-neighbor hopping matrix element $t_{ij} = 2.7$ eV. The coupling of the system with the contact reservoirs is described by the tunneling-width matrices $\Gamma^\alpha$. The transport properties can be calculated using nonequilibrium Green's functions. The retarded Green's function of the junction is given by $G^r(\omega) = [\mathbb{S}\omega - H_{gra} - \Sigma_T(\omega)]^{-1}$, where $\Sigma_T = \Sigma_\alpha \Gamma^\alpha/2$ is the tunneling selfenergy. Take the contact-system couplings in the broad-band limit, i.e., $\Gamma_{nm}^\alpha(\omega) = \Gamma_{nm}^\alpha(\mu_0)$ where $\mu_0$ is the Fermi energy of the metal leads. Also take the contact-system couplings to be diagonal matrices $\Gamma_{nm}^\alpha(\omega) = \Sigma_{l \in \alpha} \Gamma_\alpha \delta_{nl} \delta_{ml}$ coupled to π-orbitals n, m of the graphene system. The nonzero elements of $\Gamma^\alpha$(a=blue, red) are at sites indicated by either a blue square (706a) or red square (706b) in FIGS. 6A-6B and 7A-7B, corresponding to the carbon atoms of graphene covalently bonded to the contact reservoirs. The tunneling matrix element at each coupling site is set as $\Gamma_\alpha = 0.5$ eV for both the contacts (blue and red 706). $\mathbb{S}$ is the overlap-matrix between the atomic orbitals on different sites and take $\mathbb{S} = \mathbb{I}$, i.e., an orthonormal set of atomic orbitals. The tunneling width matrix $\Gamma^p$ describing the probe-sample coupling is also treated in the broad-band limit. The probe is in the tunneling regime and the probe-system coupling is weak (few meV) in comparison to the system-reservoir couplings.

Probe-Sample Coupling

The scanning tunneling thermometer is modeled as an atomically sharp Pt tip operating in the tunneling regime at a height of 3 Å above the plane of the carbon nuclei in graphene. The probe tunneling width matrices may be described in general as $\Gamma_{nm}^P(\omega) = 2\pi \Sigma_{l \in \{s,p,d ... \}} C_l V_l^m V_l^{n*} \rho_l^P(\omega)$, where $\rho_l^P(\omega)$ is the local density of states of the apex atom in the probe electrode and $V_l^m$, $V_l^n$ are the tunneling matrix elements between the l-orbital of the apex atom in the probe and the $m^{th}$, $n^{th}$ π-orbitals in graphene. The constants $C_l = C$ ∀l and has been determined by matching with the peak of the experimental conductance histogram. The Pt tip is considered to be dominated by the d-orbital character (80%) although other contributions (s~10% and p~10%) are also taken as described in "Transmission eigenvalue distributions in highly conductive molecular junctions" by J. P. Berfield et al. (Beilstein Journal of Nanotechnology, 3:40{51, 2012), which is hereby incorporated by reference in its entirety. In the calculation of the tunneling matrix elements, the w-orbitals of graphene are taken to be hydrogenic $2p_z$ orbitals with an effective nuclear charge Z=3.22. The tunneling-width matrix $\Gamma^p$ describing the probe-system coupling is in general non-diagonal.

Additional Supplemental Information

Elastic Transport.

The derivation of the Wiedemann-Franz law for elastic transport is presented below. The steady-state currents owing into reservoir p, through a quantum conductor where elastic processes dominate the transport, can be written in a form analogous to the multiterminal Buttiker formula $$I_p^{(v)} = \frac{1}{h} \sum_\alpha \int_{-\infty}^{\infty} d\omega (\omega - \mu_p)^v \mathcal{T}_{p\alpha}(\omega)[f_\alpha(\omega) - f_p(\omega)], \quad (24)$$

where $$\mathcal{T}_{p\alpha}(\omega) = Tr\{\Gamma^p(\omega) G^r(\omega) \Gamma^\alpha(\omega) G^a(\omega)\}$$

is the transmission function for an electron originating in reservoir α to tunnel into reservoir p. The notation uses v=0 to refer to the particle current and v=1 to refer to the electronic contribution to the heat current. $G_r$ ($G^a$) is the retarded (advanced) Green's function. $\Gamma^p$ and $\Gamma^\alpha$ are the tunneling width matrices describing the coupling of the system to the probe and contact α respectively. The main article gives expressions in terms of the electrical current $I_p$ which is related to the particle current by $$I_p = -eI_p^{(0)} = -\frac{e}{h} \sum_\alpha \int_{-\infty}^{\infty} d\omega \, \mathcal{T}_{p\alpha}(\omega)[f_\alpha(\omega) - f_p(\omega)], \quad (26)$$

whereas the electronic heat current is simply $$J_p = I_p^{(1)}. \quad (27)$$

Operation within the linear response regime allows one to expand the fermi functions $f_\alpha$ and $f_p$ to linear order near the equilibrium temperature and chemical potential $$f_\alpha - f_p = \left(\frac{\partial f}{\partial \mu}\right)\bigg|_{\mu_0, T_0} (\mu_\alpha - \mu_p) + \left(\frac{\partial f}{\partial T}\right)\bigg|_{\mu_0, T_0} (T_\alpha - T_p) \quad (28)$$

$$= \left(-\frac{\partial f}{\partial \omega}\right)\bigg|_{\mu_0, T_0} (-e(V_\alpha - V_p)) +$$

$$(\omega - \mu_0)\left(-\frac{\partial f}{\partial \omega}\right)\bigg|_{\mu_0, T_0} \frac{(T_\alpha - T_p)}{T_0}.$$

The electrical current $$I_p = \sum_\alpha \mathcal{L}_{p\alpha}^{(0)}(V_\alpha - V_p) + \mathcal{L}_{p\alpha}^{(1)} \frac{(T_\alpha - T_p)}{T_0}, \quad (29)$$

to linear order in the voltage and temperature gradients. Using Eq. (28) in Eq. (24), it is possible to obtain the expressions for the linear response coefficients $$\mathcal{L}_{p\alpha}^{(0)} = \frac{e^2}{h} \int_{-\infty}^{\infty} d\omega \, \mathcal{T}_{p\alpha}(\omega) \left(-\frac{\partial f}{\partial \omega}\right)\bigg|_{\mu_0, T_0} \quad (30)$$

and $$\mathcal{L}_{p\alpha}^{(1)} = \frac{-e}{h} \int_{-\infty}^{\infty} d\omega (\omega - \mu_0) \mathcal{T}_{p\alpha}(\omega) \left(-\frac{\partial f}{\partial \omega}\right)\bigg|_{\mu_0, T_0}. \quad (31)$$

The heat current $$J_p = \sum_\alpha \mathcal{L}_{p\alpha}^{(1)}(V_\alpha - V_p) + \mathcal{L}_{p\alpha}^{(2)}\frac{(T_\alpha - T_p)}{T_0}, \quad (32)$$

where it is taken that $\mu_p \approx \mu_0$ in Eq. (24) since there is interest in terms up to the linear order. Again, inferring from Eqs. (28) and (24) that $$\mathcal{L}_{p\alpha}^{(2)} = \frac{1}{h}\int_{-\infty}^{\infty} d\omega (\omega - \mu_0)^2 \mathcal{T}_{p\alpha}(\omega)\left(-\frac{\partial f}{\partial \omega}\right)\bigg|_{\mu_0, T_0}. \quad (33)$$

The derivative of the fermi function appears in the expressions for all the linear response coefficients and the Sommerfeld series expansion may be used. It can be found that $$\frac{h}{e^2}\mathcal{L}_{p\alpha}^{(0)} = \quad (34)$$
$$\mathcal{T}_{p\alpha}(\mu_0) + 2\Theta(2)(k_B T_0)^2 \mathcal{T}_{p\alpha}^{(2)}(\mu_0) + 2\Theta(4)(k_B T_0)^4 \mathcal{T}_{p\alpha}^{(4)}(\mu_0) + \ldots$$

and $$-\frac{h}{e}\mathcal{L}_{p\alpha}^{(1)} = 4\Theta(2)(k_B T_0)^2 \mathcal{T}_{p\alpha}^{(1)}(\mu_0) + \quad (35)$$
$$8\Theta(4)(k_B T_0)^4 \mathcal{T}_{p\alpha}^{(3)}(\mu_0) + 12\Theta(6)(k_B T_0)^6 \mathcal{T}_{p\alpha}^{(5)}(\mu_0) + \ldots$$

and $$h\mathcal{L}_{p\alpha}^{(2)} = 4\Theta(2)(k_B T_0)^2 \mathcal{T}_{p\alpha}(\mu_0) + \quad (36)$$
$$24\Theta(4)(k_B T_0)^4 \mathcal{T}_{p\alpha}^{(2)}(\mu_0) + 60\Theta(6)(k_B T_0)^6 \mathcal{T}_{p\alpha}^{(4)}(\mu_0) + \ldots,$$

where $\mathcal{T}_{p\alpha}^{(k)}(\mu_0)$ denotes the k-th derivative of the transmission function $\mathcal{T}_{p\alpha}(\omega)$ at $\omega = \mu_0$ and $\Theta$ is a numerical factor related to the Riemann-Zeta function $$\Theta(k+1) = \left(1 - \frac{1}{2^k}\right)\zeta(k+1). \quad (37)$$

Explicitly:

$$\Theta(2) = \frac{\pi^2}{12} \quad (38)$$

$$\Theta(4) = \left(\frac{7}{8}\right)\frac{\pi^4}{90}$$

$$\Theta(6) = \left(\frac{31}{32}\right)\frac{\pi^6}{945}.$$

The transmission function has appreciable changes on an energy scale determined by the system's Hamiltonian and its couplings to the contacts. Thus define the characteristic energy scale $\Delta$ $$\mathcal{T}_{p\alpha}(\mu_0) = \Delta^2 \mathcal{T}_{p\alpha}^{(2)}(\mu_0), \quad (39)$$

which is typically much larger than the thermal energy $k_B T_0$ for most experimental setups.

The following relation connecting $L_{p\alpha}^{(0)}$ and $L_{p\alpha}^{(2)}$, from Eqs. (34) and (36), is the Wiedemann-Franz law:

$$\mathcal{L}_{p\alpha}^{(2)} = \frac{\pi^2 k_B^2 T_0^2}{3e^2}\mathcal{L}_{p\alpha}^{(0)}\left(1 + \frac{8\pi^2}{15}\left(\frac{k_B T_0}{\Delta}\right)^2 + \ldots\right). \quad (40)$$

Calibration of Temperature.

Figure 8:
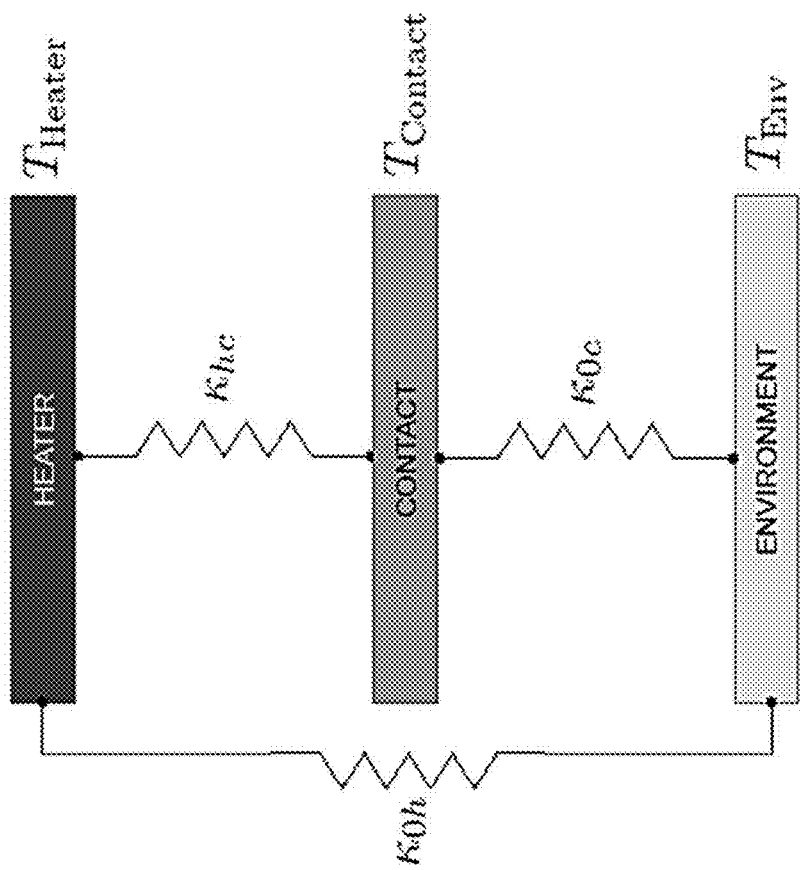
FIG. 8 illustrates an example of a thermal circuit for heat transfer between the Pt-heater, the metal contact, and the ambient environment, in accordance with various embodiments of the present disclosure.

The thermoelectric circuit needs the calibration of the contact temperatures which is described here. The Pt-heater is fabricated atop an electrically insulating layer above the metal contact $\alpha$ and has a thermal conductivity $\kappa_{hc}$ with the contact. The temperature of the Pt-heater can be inferred from its resistivity. The contact $\alpha$ is heated when an electrical current is passed in the Pt-heater but it also loses heat to the ambient environment which is at the equilibrium temperature $T_{Env} = T_0$. Denote the thermal conductivity between the contact and the ambient environment by $\kappa_0$. FIG. 8 illustrates an example of the thermal circuit. Shown is a thermal circuit for heat transfer between the Pt-heater, the metal contact, and the ambient environment. The contact temperature is nearly equal to that of the Pt-heater, $T_{Contact} \approx T_{Heater}$, when they are in good thermal contact $\kappa_{hc} \gg \kappa_{0c}$.

The heat current flowing into the contact is given by $$\dot{Q}_{in} = \kappa_{hc}(T_{Heater} - T_{Contact}) \quad (41)$$

whereas the heat current flowing out $$\dot{Q}_{out} = \kappa_{0c}(T_{Contact} - T_{Env}). \quad (42)$$

In steady state, the rate of heat ow into the contact is equal to the rate of heat lost to the ambient environment and we find $$T_{Contact} = \frac{\kappa_{hc}T_{Heater} + \kappa_{0c}T_{Env}}{\kappa_{hc} + \kappa_{0c}}. \quad (43)$$

When the heater is in good thermal contact $\kappa_{hc} \gg \kappa_{0c}$, it is found that $$T_{Contact} \approx T_{Heater}. \quad (44)$$

An alternating voltage $V(t) = V_{max}\cos(\omega t)$ results in a current $I(t) = G_{Pt}V(t)$ in the heater. The power dissipated via Joule heating is given by $$P = G_{Pt}V_{max}^2\cos^2(\omega t) = \frac{1}{2}G_{Pt}V_{max}^2(1 + \cos(2\omega t)), \quad (45)$$

which results in $2\omega$ modulations of the heater temperature $$T_{Heater} = T_0 + \Delta T_{max}(1 + \cos(2\omega t)), \quad (46)$$

since the net power dissipated by the heater can be written as $$P = \kappa(T_{Heater} - T_0), \text{ where,} \quad (47)$$

$$\kappa = \kappa_{0h} + \frac{\kappa_{hc}\kappa_{0c}}{\kappa_{hc} + \kappa_{0c}},$$

as seen from the thermal circuit shown in FIG. 8

The temperature of the heater is inferred from the conductance (or resistivity) dependence of the Pt heating element $G_{Pt}(T)$. The modulation frequency is chosen so that $\omega \ll 1/\tau$, where $\tau$ is the thermal time constant of the metal contact, so that it has enough time to thermally equilibrate. It is understood that such a frequency allows the heater itself to equilibrate and enter a steady-state of heat transfer with the metal contact. The temperature modulations in the metal contact closely follow that of the heater when there is good thermal contact:

$$T_{Contact}(t) = T_0 + \Delta T_{max}(1 + \cos(2\omega t)). \quad (48)$$

$\Delta T_{max}$ can be chosen such that the contact would reach a maximum temperature of $T_0 + 2\Delta T_{max}$. The calibration fixes $\Delta T_{max}$ accurately.

Note that the temperature modulations can be obtained by means other than using a Pt resistor. A graphene flake itself undergoes Joule heating and could therefore be used as a heating element so long as one is able to calibrate its temperature accurately.

Tunneling Currents—

Thermoelectric Circuit. The tunneling current resulting from the heating of the contact is given by $$I_p = \mathcal{L}_{p\alpha}^{(1)} \frac{(T_\alpha - T_0)}{T_0} \quad (49)$$

during the operation of the thermoelectric circuit. Standard lock-in techniques can be employed to measure the current amplitude at frequency $2\omega$. It is easy to see from Eq. (48) that the current amplitude $$I_p|_{2\omega} = \mathcal{L}_{p\alpha}^{(1)} \frac{\Delta T_{max}}{T_0}. \quad (50)$$

FIGS. 9A and 9B illustrate an example of the spatial variation of the amplitude of the tunneling current in the thermoelectric circuit. FIGS. 9A and 9B show the tunneling current amplitude resulting from the heating of the first contact 906b and second contact 906a as shown with the black squares in the corresponding panel. The gating potential is set at $\mu_0 = -2.28$ eV with respect to the Dirac point. The amplitude of temperature variations in the contacts [cf. Eq. (48)] is taken to be 10% of the equilibrium temperature $\Delta T_{max}/T_0 = 0.1$.

The probe is held at a constant height of 3 Å above the plane of the sample. Assuming a modest increase in the contact temperature by setting $\Delta T_{max} = (10\%)T_0$ where the equilibrium temperature $T_0 = 4$ K. The corresponding contact $\alpha = \{1,2\}$ is shown by black squares 906 in FIGS. 9A and 9B and represent the sites of the sample which are covalently bonded to the metal contact $\alpha$. $\alpha = 1$ is shown in FIG. 9A and $\alpha = 2$ is shown FIG. 9B. The tunneling current amplitude is as high as 150 pA at some points on the sample and is therefore well within the reach of present experimental resolution. Since the numerical results are illustrated for an experiment performed at liquid He temperatures (4 K), the thermoelectric response is suppressed and gating becomes important. If, for example, $T_0$ was set to 40 K, a hundred-fold increase in the tunneling current amplitude would exist [cf. Eqs. (50) and (35)] and gating would be less important.

Gating. It has been found that the system has a sufficiently large thermoelectric response at 4 K, i.e. the current amplitude in Eq. (50) is experimentally resolvable, when the system is gated appropriately. Indeed, the disclosed method works perfectly well for systems which do not have a good thermoelectric response. In such a case, $L_{p\alpha}^{(1)}$ would have a low value and would result in a current amplitude which is too small to measure. This merely implies that the thermoelectric contribution to the measured temperature is very small—that is, a voltage bias within the linear response regime does not lead to measurable differences in temperatures across the sample. The system's gating was chosen so that the thermoelectric response is appreciable and there are measurable temperature differences across the sample even in the case of a voltage bias. This latter case was found to be more interesting.

Figure 10:
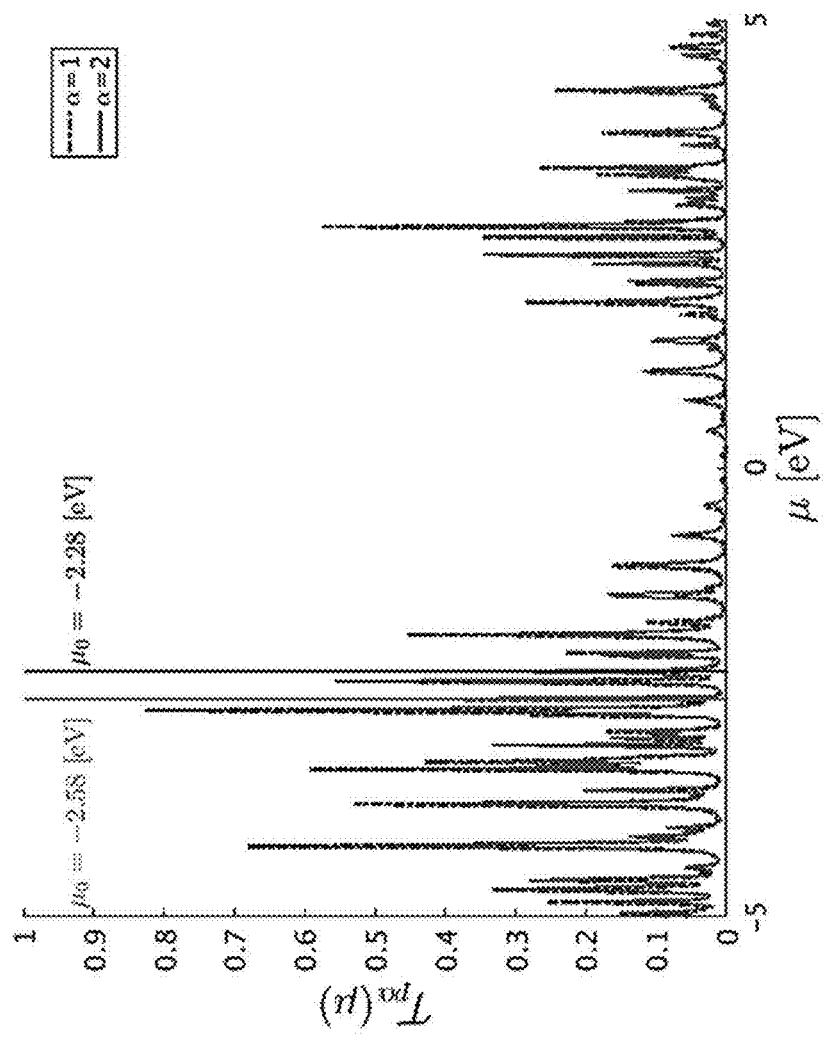
FIG. 10 illustrates transmission functions with respect to gating potential, in accordance with various embodiments of the present disclosure.

The thermoelectric coefficient depends on the transmission derivative [cf. Eq. (35)] near the equilibrium chemical potential. FIG. 10 illustrates an example of a transmission function $\mathcal{T}_{p\alpha}$ from contact $\alpha$ into the STM probe p. $\alpha = \{1,2\}$ are shown in dotted-dashed lines respectively. The conductance circuit measurement is illustrated at a gating potential of $\mu_0 = -2.58$ eV (left vertical line). However, the thermoelectric circuit is illustrated at a gating potential of $\mu_0 = -2.28$ eV (right vertical line) since the transmission functions show a large change at that choice of gating, thereby resulting in an enhanced thermoelectric effect.

In FIG. 10, the transmission functions is shown as a function of the chemical potential. FIG. 10 shows the transmission spectra into the probe from the two contacts $\alpha = \{1,2\}$ for one representative point on the sample where the probe is held at a height of 3 Å above the plane of the sample. The transmission spectra would change from point to point on the sample but will roughly resembles the one in FIG. 10. The contact $\alpha = 1$ and $\alpha = 2$ are shown. It was found that the transmission derivatives are enhanced when the chemical potential is tuned (via the gate voltage) to $\mu_0 = -2.28$ eV and therefore illustrated the thermoelectric circuit for this choice of gating. The resulting temperature measurement is shown in FIGS. 7A and 7B for a pure voltage bias. The spatial variations in the transmission derivatives would resemble the pattern shown in FIGS. 9A and 9B [cf. Eq. (35)].

Tunneling Currents—Conductance Circuit.

The tunneling current resulting from the conductance circuit would simply be $$I_p = \mathcal{L}_{p\alpha}^{(0)}(V_\alpha - V_p). \quad (51)$$

Figure 11B:
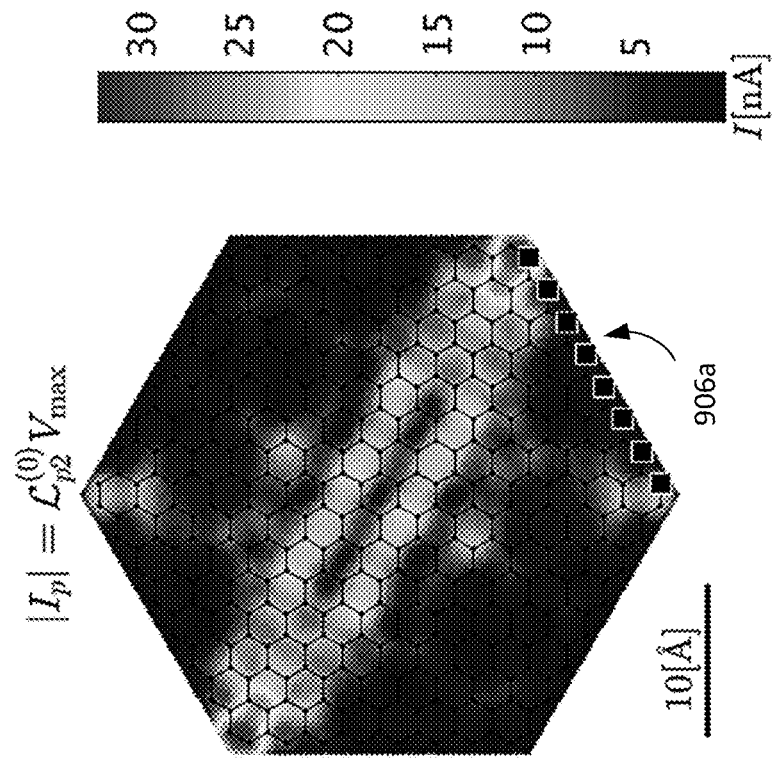
Figure 11A:
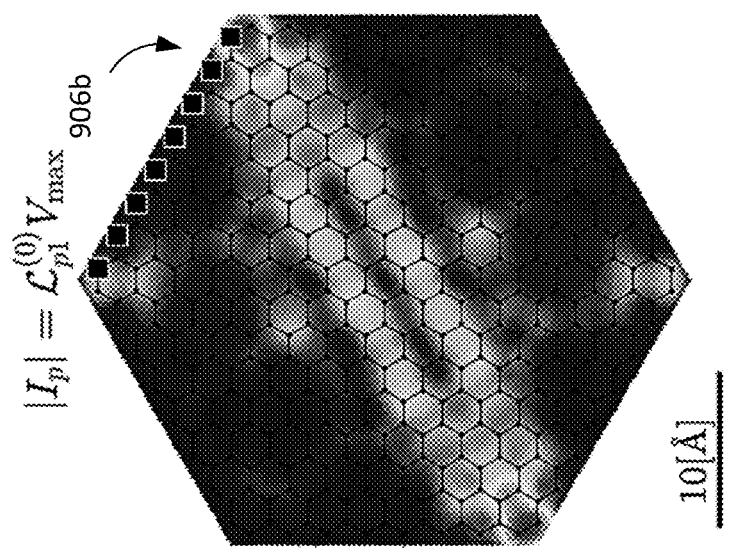

An ac voltage $V_\alpha - V_p = V(t) = V_{max} \cos(\omega t)$ is applied across the contact-probe junction and the resulting tunneling current measured $$I_p(t) = \mathcal{L}_{p\alpha}^{(0)} V_{max} \cos(\omega t) \quad (52)$$

using standard lock-in techniques. The tunneling current amplitude at frequency $\omega$ $$i_p|_\omega = \mathcal{L}_{p\alpha}^{(0)} V_{max} \quad (53)$$

is measured across the sample. FIGS. 11A and 11B illustrate amplitude of the tunneling current in the conductance circuit. The gating potential is set at $\mu_0 = -2.58$ eV with respect to the Dirac point. FIGS. 11A and 11B show the tunneling current amplitude resulting from the voltage bias between the first contact or second contact and the probe, respectively, $V_\alpha - V_P = V(t) = V_{max} \cos(\omega t)$, as shown with the black squares in the corresponding panel.

The amplitude of voltage modulations $V_{max} = 1$ mV and a scan of the sample is obtained by maintaining the probe tip at a height of 3 Å above the plane of the sample. The tunneling current amplitude is as high as 30 nA for some regions in the sample. Generally, gating doesn't play as important a role in the measurement of conductances since tunneling currents of the order of a few nA for most choices of gating. The corresponding contact $\alpha = \{1,2\}$ is shown by black squares 906 in FIGS. 11A and 11B and represent the sites of the sample which are covalently bonded to the metal contact. $\alpha = 1$ is shown in FIG. 11A and $\alpha = 2$ is shown FIG.

11B. The resulting temperature measurement is shown in FIGS. 6A and 6B for a pure temperature bias.

CONCLUSION

To achieve high spatial resolution in thermal measurements has been a challenge. One important obstacle has been the difficulty in designing a thermal probe that exchanges heat with the system of interest but is thermally isolated from the environment. This seemingly intractable problem may be circumvented by inferring thermal signals using purely electrical measurements. The basis of the disclosed approach is the Wiedemann-Franz law relating the thermal and electrical currents flowing between a probe and the system of interest.

This approach to nanoscale thermometry has been illustrated with simulations of a scanning tunneling probe of a model nanostructure of a graphene flake under thermoelectric bias. It was shown that the local temperature inferred from a sequence of purely electrical measurements agrees exceptionally well with that of a hypothetical thermometer coupled locally to the system and isolated from the environment. Moreover, the measurement provides the electronic temperature decoupled from all other degrees of freedom and can therefore be a vital tool to characterize nonequilibrium device performance. The proposed scanning tunneling thermometer exceeds the spatial resolution of current state-of-the-art thermometry by some two orders of magnitude.

A method has been presented to map temperature variations in nanoscale conductors using only electrical measurements. The measurements can be made using standard STM techniques and are valid for any quantum coherent conductor dominated by elastic transport processes and operating within linear response conditions. Under these conditions, the Wiedemann-Franz law holds true and one can obtain the thermal conductance by a measurement of the electrical conductance. The importance of joint probe measurements, which needs a vanishing of both electronic particle and heat currents into the probe, was presented. The operation of the probe in the tunneling regime results in a dramatic enhancement of the spatial resolution by over two orders of magnitude when compared with existing SThM schemes. Importantly, the disclosed method precisely accounts for the electronic contribution to the heat current decoupled from all other degrees of freedom. The method therefore not only provides a way to show quantum coherent temperature variations in a nanoscale conductor but also can be an important tool to characterize nonequilibrium electronic device performance.

Where a range of values is provided, it is understood that each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

It must be noted that, as used in the specification and the appended claims, the singular forms "a," "an," and "the" include plural referents unless the context clearly dictates otherwise.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. In an embodiment, "about 0" can refer to 0, 0.001, 0.01, or 0.1. In an embodiment, the term "about" can include traditional rounding according to significant figures of the numerical value. In addition, the phrase "about 'x' to 'y'" includes "about 'x' to about 'y'".

It should be emphasized that the above-described embodiments of the present disclosure are merely possible examples of implementations, and are set forth only for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure.

Therefore, at least the following is claimed:

1. A device comprising:
an interconnect structure comprising connections to a first reservoir and a second reservoir, the interconnect structure configured to support a nanostructure between the connections to the first and second reservoirs; and
a scanning tunneling probe comprising a probe tip in series with a calibrated thermoresistor, the scanning tunneling probe in contact with a probe reservoir, wherein electrical measurements are simultaneously obtained for temperature and voltage applied to the nanostructure.

2. The device of claim 1, wherein the scanning tunneling probe scans a surface at a constant height and is not in contact with the nanostructure surface.

3. The device of claim 1, wherein the first reservoir or the second reservoir is biased to form a system in which the nanostructure is out of equilibrium.

4. The device of claim 1, further comprising a switch connected to each of the first and second reservoirs, wherein the switch connects or disconnects the first reservoir or the second reservoir to a time-modulated voltage.

5. The device of claim 1, wherein the nanostructure is a nanoscale conductor.

6. The device of claim 1, wherein the nanostructure is connected to more than two reservoirs through corresponding switches.

7. The device of claim 6, wherein a single one of the more than two reservoirs is connected to the interconnect structure by the corresponding switch while all other reservoirs of the more than two reservoirs remain disconnected.

8. A method, comprising:
simultaneously measuring conductance and thermopower of a nanostructure by toggling between:
applying a time modulated voltage to the nanostructure disposed on an interconnect structure, the time modulated voltage applied at a probe tip positioned over the nanostructure, while measuring a resulting current at a contact of the interconnect structure; and
applying a time modulated temperature signal to the nanostructure at the probe tip, while measuring current through a calibrated thermoresistor in series with the probe tip.

9. The method of claim 8, wherein the time modulated voltage is provided by an AC bias voltage.

10. The method of claim 8, wherein the time modulated voltage is alternated between a first reservoir and a second reservoir.

11. The method of claim 10, wherein the first reservoir is connected to a first side of the nanostructure and the second reservoir is connected to a second side of the nanostructure opposite the first side.

12. The method of claim 8, wherein the nanostructure is a nanoscale conductor.

13. The method of claim 8, comprising repositioning the probe tip to another location over the nanostructure before repeating the simultaneous measurement of conductance and thermopower of the nanostructure.

14. The method of claim 13, wherein the probe tip is maintained at a constant height over the nanostructure during the simultaneous measurements at different locations.

15. The method of claim 8, wherein the nanostructure is connected to more than two reservoirs.

16. The method of claim 15, wherein a switch connects a single one of the more than two reservoirs while all other reservoirs of the more than two resevoirs are disconnected.

17. A device comprising:
an interconnect structure comprising connections to a first reservoir and a second reservoir, the interconnect structure configured to support a nanostructure between the connections to the first and second reservoirs;
controllable calibrated heating elements on the first and second reservoirs; and
a scanning tunneling probe comprising a sharp probe tip, wherein electrical measurements are simultaneously obtained for temperature and voltage applied to the nanostructure.

18. The device of claim 17, wherein the scanning tunneling probe scans a surface at a constant height and is not in contact with the nanostructure surface.

19. The device of claim 17, further comprising a switch connected to each of the controllable calibrated heating elements, wherein the switch connects or disconnects the controllable calibrated heating elements to a time-modulated voltage.

20. The device of claim 19, further comprising a switch connected to each of the first and second reservoirs, wherein the switch connects or disconnects the first reservoir or the second reservoir to a time-modulated voltage.

* * * * *